United States Patent
Ohki et al.

(10) Patent No.: US 6,839,847 B1
(45) Date of Patent: Jan. 4, 2005

(54) INFORMATION PROCESSING EQUIPMENT AND IC CARD

(75) Inventors: Masaru Ohki, Tokorozawa (JP); Yasuko Fukuzawa, Yokohama (JP); Susumu Okuhara, Yokohama (JP); Masahiro Kaminaga, Sakado (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/449,537

(22) Filed: Nov. 29, 1999

(30) Foreign Application Priority Data

Nov. 30, 1998 (JP) .......................................... 10-338779

(51) Int. Cl.⁷ .............................................. G06F 11/00
(52) U.S. Cl. ...................... 713/194; 713/200; 713/340; 713/193; 713/601; 380/268; 705/65; 705/57
(58) Field of Search ............................ 380/268; 705/57, 705/65, 66, 67, 73, 41; 713/159, 172, 191, 601, 192, 193, 200, 340; 235/380, 381, 382

(56) References Cited

U.S. PATENT DOCUMENTS

| | | | | |
|---|---|---|---|---|
| 4,916,333 A | * | 4/1990 | Kowalski | 307/296.5 |
| 4,932,053 A | | 6/1990 | Fruhauf et al. | 380/4 |
| 5,572,736 A | * | 11/1996 | Curran | 395/750 |
| 5,896,325 A | | 4/1999 | Fujioka | 365/189.07 |
| 5,917,754 A | * | 6/1999 | Pathak et al. | 365/185.21 |
| 6,219,291 B1 | * | 4/2001 | Sowards et al. | 365/207 |

FOREIGN PATENT DOCUMENTS

| | | | | |
|---|---|---|---|---|
| CN | 1199206 A | 11/1997 | | |
| EP | 448262 | 9/1991 | ............. | G06F/1/00 |
| FR | 2745924 | 9/1997 | ............. | G06F/1/00 |
| WO | WO 96/20461 | 7/1996 | ............. | G07F/7/10 |

OTHER PUBLICATIONS

Bruce Schneier: "Applied Cryptography" 1st Ed. 1994, John Wiley & Sons, pp. 224–225.*
Kocher, Paul, et al, "Introduction to Differential Power Analysis and Related Attacks", Cryptograph Research, 1998, pp. 1–5.
Kocher, Paul, et al, "Differential Power Analysis", Proceedings of Advances in Cryptology—Crypt '99, Springer–Verlay, 1999, pp. 388–397. Reprinted on Internet www.cryptography.com/resources/whitepaters/DPA.pd. as pp. 1–10.
"Smart Card Handbook", p. 263.

* cited by examiner

Primary Examiner—Matthew Smithers
Assistant Examiner—Paul E. Callahan
(74) Attorney, Agent, or Firm—Mattingly, Stanger & Malur, P.C.

(57) ABSTRACT

An IC card having a storage memory including a program storage unit for storing a program and a data storage unit for storing data and a central processing unit for executing a predetermined process in accordance with the program to process the data, the program including one or more data process units each having a process instruction for giving an execution instruction to the central processing unit, wherein a data process order is randomly exchanged and a dummy process is added to thereby reduce the dependency of consumption current of an IC chip upon the data process.

12 Claims, 23 Drawing Sheets

CONSUMPTION CURRENT DURING ONE CYCLE OF IC CARD CHIP

| 16 | 7 | 20 | 21 |
|----|----|----|----|
| 29 | 12 | 28 | 17 |
| 1 | 15 | 23 | 26 |
| 5 | 18 | 31 | 10 |
| 2 | 8 | 21 | 14 |
| 32 | 27 | 3 | 9 |
| 19 | 13 | 30 | 6 |
| 22 | 11 | 4 | 25 |

E SELECTABLE PERMUTATION TABLE

|   | 1 | 2 | 3 | 4 | 5 | 6 |
|---|---|---|---|---|---|---|
| 1 | 32 | 1 | 2 | 3 | 4 | 5 |
| 2 | 4 | 5 | 6 | 7 | 8 | 9 |
| 3 | 8 | 9 | 10 | 11 | 12 | 13 |
| 4 | 12 | 13 | 14 | 15 | 16 | 17 |
| 5 | 16 | 17 | 18 | 19 | 20 | 21 |
| 6 | 20 | 21 | 22 | 23 | 24 | 25 |
| 7 | 24 | 25 | 26 | 27 | 28 | 29 |
| 8 | 28 | 29 | 30 | 31 | 32 | 1 |

FIG. 29

S BOX TABLE

|   | 1 | 2 | 3 | 4 |
|---|---|---|---|---|
| 1 | 14 | 4 | 13 | 1 |
| 2 | 0 | 15 | 7 | 4 |
| 3 | 4 | 1 | 14 | 8 |
| 4 | 15 | 12 | 8 | 2 |

FIG. 30

EXTENDED S BOX TABLE

|   | 1 | | 2 | | 3 | | 4 | |
|---|---|---|---|---|---|---|---|---|
| 1 | 14 | 1 | 4 | 11 | 13 | 2 | 1 | 14 |
| 2 | 0 | 15 | 15 | 0 | 7 | 8 | 4 | 10 |
| 3 | 4 | 11 | 1 | 14 | 14 | 1 | 8 | 7 |
| 4 | 15 | 0 | 12 | 3 | 8 | 7 | 2 | 13 |

INFORMATION PROCESSING EQUIPMENT AND IC CARD

BACKGROUND OF THE INVENTION

The present invention relates to an information processing equipment, and more particularly to a tamper resistance device such as an IC card (smart cart) having high security.

An IC card is mainly used for storing information in a manner so as not to be altered by a third party or for enciphering data or deciphering a cipher text by using a cipher key which is kept in secret. Since the IC card is not provided with a power source, it becomes operable when it is inserted into a reader-writer. The IC card receives a command from the reader-writer to execute data transfer. A general explanation of IC cards is given, for example, in "IC Card" by Jyunichi Mizusawa, by Ohm Publication Co., compiled by the Institute of Electronics, Information and Communication Engineers.

As shown in FIG. 1, an IC card has the structure that an IC card chip 102 is fabricated on a card 101. A general IC card has contacts via which a power is supplied from a reader-writer and data is transferred.

The structure of an IC card chip is basically the same as that of a microcomputer. As shown in FIG. 2, the IC card chip includes a central processor 201, a storage memory 204, an input/output port 207, and a co-processor 202. The central processor 201 executes logical and arithmetic calculations, and the storage memory 204 stores programs and data. The input/output port 207 communicates with a reader-writer. The co-processor is a special calculation device for executing modular calculations, and is used for calculations in anti-symmetric RSA or the like. Many of IC card processors have no co-processor. A data bus 203 interconnects components of the IC card.

The storage memory 204 includes a ROM (Read Only Memory), a RAM (Random Access Memory), an EEPROM (Electrically Erasable Programmable Read Only Memory) and the like. ROM is a memory whose contents cannot be rewritten freely and stores mainly programs. RAM is a memory whose contents can be rewritten freely and are erased if a power supply is intercepted. When the IC card is disconnected from the reader-writer, a supply of the power is intercepted so that the contents of RAM cannot be retained. EEPROM is a memory whose contents can be retained even if a supply of the power is intercepted. Therefore, EEPROM is used for storing data which may be rewritten and can be retained even if the IC card is disconnected from the reader-writer. For example, the number of prepaid times of a prepaid card is stored in EEPROM because it is updated each time the card is used and the contents thereof are required to be retained even if the card is disconnected from the reader-writer.

An IC card is used for storing programs and important information in the IC card chip to execute a cipher process. It has been long considered that the difficulty in decryption of a cipher process executed in the IC card is the same as decryption of a ciphering algorithm. However, it has been suggested recently that there is a possibility of presuming the contents of a cipher process and a cipher key by measuring and analyzing a consumption current while the cipher process is executed, easier than decryption of a cipher algorithm. The consumption current can be monitored by measuring the current supplied from the reader-writer. This possible danger is described in "Smart Card Handbook", by W. Rankl & W. Effing, John Wiley & Sons, paragraph 8.5.1.1 "Passive protective mechanisms, at p. 263.

CMOSs constituting an IC card chip consume current when an output state changes from "1" to "0" or vice versa. The data bus 203 in particular flows a large current when its state changes from "1" to "0" or vice versa, because it has a large electrical capacitance. This suggests a possibility of presuming the operation state in the IC card chip by monitoring the consumption current.

FIG. 5 shows wave shapes of consumption current during one cycle of an IC card chip. Depending upon processed data, the current wave shape becomes different as indicated at 501 and 502. This difference is generated depending upon data on the bus 203 and data processed by the central processor 201.

The co-processor 202 can execute a modular calculation of a long train of bits, e.g., 512 bits, in parallel with the central processor 201. Therefore, it is possible to monitor the wave shape of a consumption current different from that of the central processing unit 201 during a long period of time. By monitoring its distinctive wave shape, the number of operations of the co-processor can be easily measured. If there is any correlation between the number of operations of the co-processor and a cipher key, it is possible to presume the cipher key from the number of operations of the co-processor.

If the calculation contents of the co-processor have any shift specific to the cipher key, there is also a possibility of presuming a cipher key by identifying the shift from the consumption current. Such possibilities are also applicable to the central processor. Since the value of bits of a cipher key is fixed, an influence of the value of bits of the cipher key may possibly be monitored by monitoring the consumption current by changing data to be processed.

SUMMARY OF THE INVENTION

The main issue to be solved by the invention is to reduce the correlation or dependency between data processing and its consumption current of an IC card chip. If the correlation between data processing and its consumption current is reduced, it becomes difficult to presume the operation of the IC card chip and a cipher key from the monitored wave shape of a consumption current. The invention pays attention to that a presumption of the operation and cipher key from the wave shape of a consumption current can be made difficult by randomizing the process sequence in an IC card chip and inserting a dummy process.

A tamper resistance device, typically an IC card, can be considered as an information processing equipment having a program storage unit for storing a program and a data storage unit for storing data and a central processing unit for executing a predetermined process in accordance with the program to process the data, the program including one or more data process units each having a process instruction for giving an execution instruction to the central processing unit. In this invention, as one method of reducing the dependency of consumption current of an IC chip upon data process, normal input data and its bit inverted data are processed. By using the normal input data and its bit inverted data by the same instruction, the number of transitions of the data on a data bus, from "0" to "1" or vice versa, can be made constant. The data transition on the data bus consumes large current. By making the number of transitions on the data bus constant, the number of current consumptions is made constant so that the dependency of consumption current upon data process can be reduced.

As an alternative method of processing normal data and bit inverted data in the same manner, a routine of processing the bit inverted data by an instruction same as the normal instruction, if the same routine cannot process both the normal data and bit inverted data. Normal input data and bit inverted data are always generated for the data once processed in order to process the normal data and bit inverted data in the same manner.

As an alternative method of reducing the dependency of consumption current upon data process, if there are repetitive processes as many as the number of data sets to be processed, the data is not processed in the predetermined order but the process order is changed randomly. Another method is to add a dummy process which does not influence the corresponding process of a program, so that what operation of the equipment is executed at which place cannot be known. A combination of dummy processes and random execution of repetitive processes is effective for reducing the dependency of consumption current upon data process.

Use of both the normal data and bit inverted data and a combination of dummy processes and random execution of repetitive processes is particularly effective for reducing the dependency of consumption current upon data process during a data permutation process and data substitution process on a byte-unit basis.

Cryptosystems such as DES (data encryption standard) use many exclusive logical OR operations. Therefore, an exclusive logical OR unit for performing an exclusive logical OR of input data and cipher key data and a bit inverted exclusive logical OR unit for performing an exclusive logical OR of bit inverted input data and cipher key data, are effective for reducing the dependency of consumption current upon data process. A nonlinear substitution process unit for nonlinearly substituting input data and generating a substitution result and bit inverted substitution result and a nonlinear substitution process unit for nonlinearly substituting input bit inverted data and generating a substitution result and bit inverted substitution result, are effective for reducing the dependency of consumption current upon data process. A nonlinear permutation process unit for nonlinearly permuting input data and generating a permutation result and bit inverted permutation result and a nonlinear permutation process unit for nonlinearly permuting input bit inverted data and generating a permutation result and bit inverted permutation result, are effective for reducing the dependency of consumption current upon data process.

A combination of: the nonlinear substitution process unit for nonlinearly substituting input data and generating a substitution result and bit inverted substitution result; the nonlinear substitution process unit for nonlinearly substituting input bit inverted data and generating a substitution result and bit inverted substitution result; the nonlinear permutation process unit for nonlinearly permuting input data and generating a permutation result and bit inverted permutation result; and the nonlinear permutation process unit for non linearly permuting input bit inverted data and generating a permutation result and bit inverted permutation result, is effective for reducing the dependency of consumption current upon data process.

In the RSA cryptosystem utilizing a difficulty in prime factorization, a modular exponentiation calculation is performed by repeating a modular multiplication by using input data and a cipher key. One method of reducing the dependency of consumption current upon data process uses a modular multiplication process unit for performing a modular multiplication of input data multiplied by an intermediate modular calculation result irrespective of a value of bits of the cipher key and a modular multiplication result selection unit for using a modular multiplication result by the modular multiplication process unit if the value of bits of the cipher key is 1, and neglecting the modular multiplication result by the modular multiplication process unit if the value if 0. It is therefore possible to perform a modular multiplication irrespective of the value of bits of the cipher key. In this manner, the dependency of consumption current upon data process can be reduced, and it becomes difficult to presume the cipher key from the number of modular multiplication executions.

The performance of RSA can be improved by using a modular exponentiation process unit for performing a modular exponentiation of input data in correspondence with each value of a plurality of bits and a modular multiplication process unit for performing a modular multiplication of the modular exponentiation result by the modular exponentiation process unit multiplied by an intermediate modular calculation result. With this method, however, a pair of modular exponentiation results is always used so that there is a possibility of presuming the cipher key from the dependency of consumption current upon data process. One method of solving this is to use a modular exponential result change process unit for changing the modular exponentiation result at a timing while the modular multiplication process unit processes to change the modular exponentiation result at a constant cycle pitch. With this method, although it depends upon the change method, there is a case in which the modular exponentiation result is required to be changed to the original value. As one method for this, an inverse process unit is used for recovering the modular exponentiation result before the result is changed by the modular exponentiation process result change process unit. The inverse process unit can be realized by several method. One method is to add an integer multiple of a modulus of a modular calculation to the modular exponentiation result. In an another method, the modular exponentiation result change process unit performs a modular exponentiation of the modular exponentiation result multiplied by v or v raised to a certain power among two values u and v whose molecular multiplication by using the modulus in the modular calculation is 1 and the inverse process unit performs a modular exponentiation of u raised to the power whose order corresponds to the number of times during the modular multiplication through multiplication by v. One method of calculating the values v and u is to make the modular exponentiation result change process unit use two values 2 and (N+1)/2 whose molecular multiplication by using the modulus N in the modular calculation is 1. For the RSA cryptosystem, if the modular exponentiation process unit performs a modular exponentiation of input data raised to a certain power corresponding to each of all combinations of M bits of 0 and 1 of the cipher key; if the modular exponentiation result change process unit executes at a certain timing a modular exponentiation of the modular exponentiation result multiplied by v or v raised to a certain power among two values u and v whose molecular multiplication by using the modulus N in the modular calculation is 1; if the modular multiplication process unit performs a modular multiplication of a modular exponentiation result by the modular exponentiation process unit multiplied by an intermediate modular multiplication result in correspondence to each of the value of the M bits of the cipher key; and if the inverse process unit performs a modular exponentiation of u raised to the power whose order corresponds to the number of times during the modular multiplication through multiplication by v, then the dependency of consumption current upon data process can be reduced effectively. In this case, the values v and u can be obtained easily if the modular exponentiation result change process unit executes at a certain timing a modular exponentiation of the modular exponentiation result multiplied by v which takes an arbitrary binary power by using the modulus N in the modular calculation, and if the inverse process unit performs a modular exponentiation of (n+1)/2 raised to the power whose order corresponds to the number of times during the modular multiplication through multiplication by 2.

BRIEF DESCRIPTION OF THE DRAWINGS

FIG. 11 illustrates a routine of first processing an execution result of a normal exclusive logical OR.

FIG. 12 illustrates a routine of first processing an execution result of bit inverted exclusive logical OR.

FIG. 27 shows an E selectable permutation table.

FIG. 29 shows an S box table.

FIG. 30 shows an extended S box table.

DETAILED DESCRIPTION OF THE EMBODIMENTS

Embodiments of the invention will be described with reference to the accompanying drawings.

Figure 1:
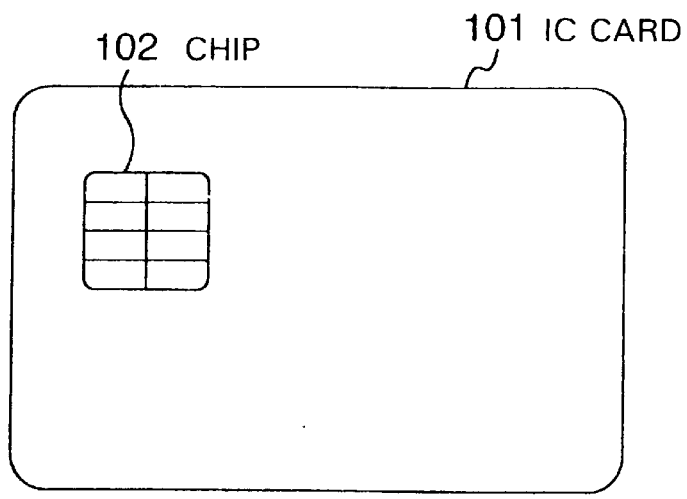
FIG. 1 shows the hardware structure of an IC card.

FIG. 1 is a plain view of an IC card. The position of an IC card chip 102 and the number of contacts and their assignments of the IC card 101 are defined by ISO 7816 specifications.

Figure 2:
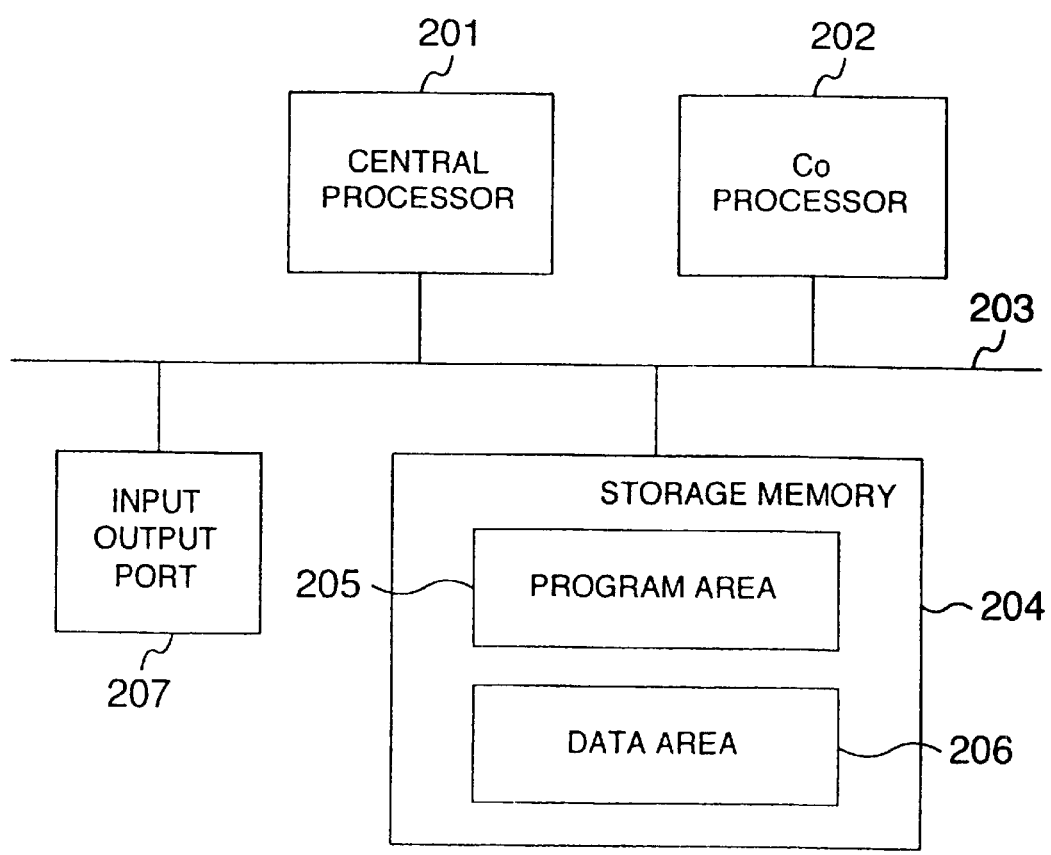
FIG. 2 shows the hardware structure of an IC card chip.

FIG. 2 shows the internal structure of the IC card chip 102. The structure has been described already with respect to conventional techniques. According to this invention, a program 205 is not executed always in the same manner, but it is executed randomly or a dummy process is added in order to reproduce the wave shape of a current to be consumed by hardware of the IC card chip.

In this embodiment, although symmetric DES and anti-symmetric RSA are used by way of example, the embodiment may be applied to other cryptosystems. Cryptosystems such as DES and RSA are described, for example, in "Introduction of Cryptography Theory" by Eiji Okamoto, KYOURITSU Publication Co.

DES performs encryption and decryption of 64-bit data (plain text and cipher text) by using a cipher key of 56-bits. Since the same cipher key is used for encryption and decryption, DES is called a symmetric cryptography. As trump cards are turned randomly, bits of a plain text (to be enciphered) are randomly exchanged and enciphered. Data exchange is performed in accordance with the cipher key. When data is deciphered, bits of a cipher text are exchanged in the reverse order of the enciphering to recover the original data. Data exchange of DES uses two exchange methods one being a one-bit unit basis and the other being a plural-bit unit basis. The former is called permutation and the latter called substitution.

Figure 3:
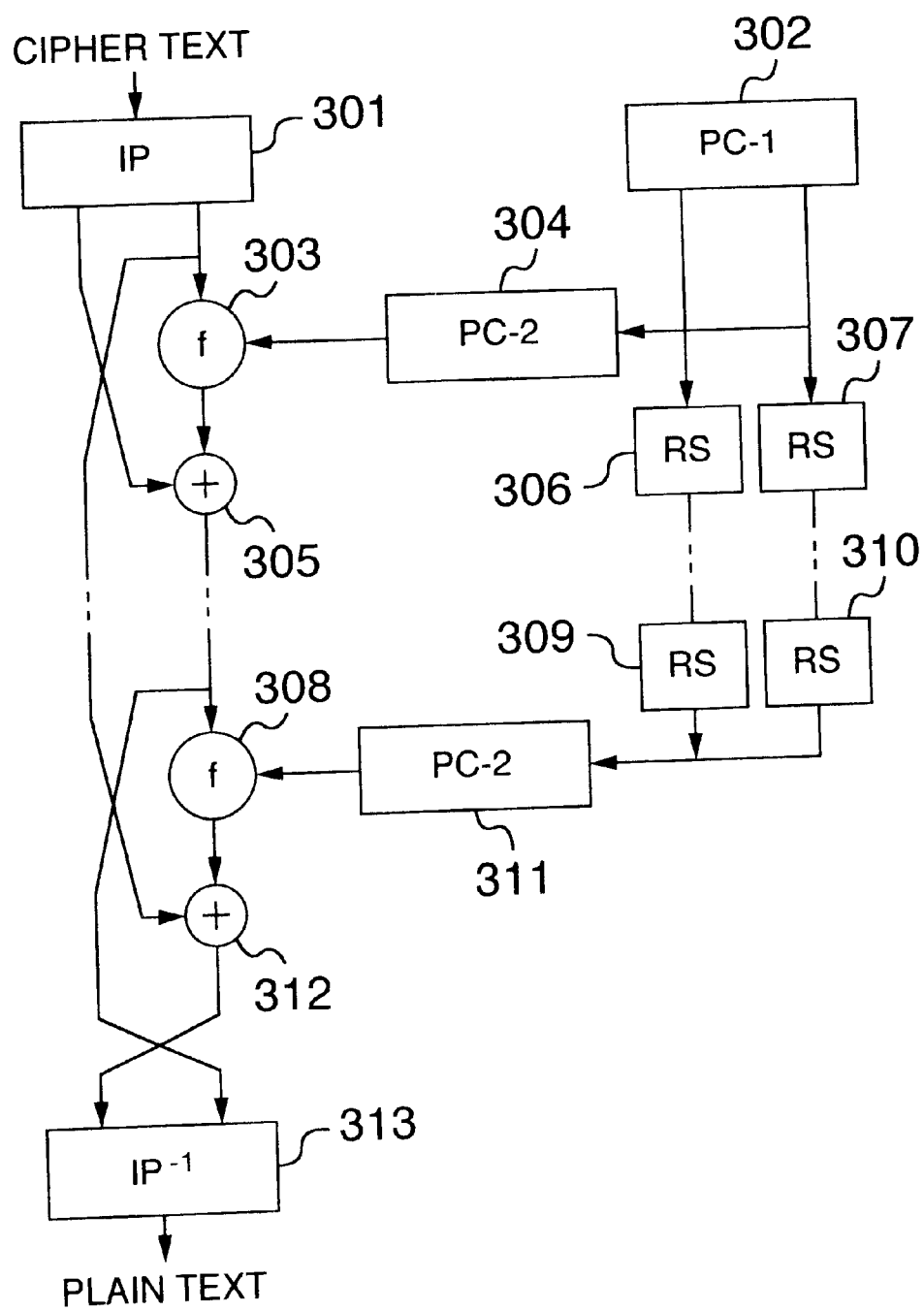
FIG. 3 shows an overall process flow of DES.

Referring to FIG. 3, DES cryptography will be described. A cipher text is subjected first to initial permutation (IP) 301. This permutation is performed by using an initial permutation table to exchange 64-bit data of the cipher text on the one-bit unit basis. A series of such operations is repeated sixteen stages to inverse permutation ($IP^{-1}$) 313 of the initial permutation.

At each stage, a process called a f function 303 is calculated by inputting data of 32 bits of either the first or second half at the preceding stage and the cipher key, and then an exclusive logical OR operation 305 is performed by using the output of the f function and 32 bits of the remaining half at the preceding state. Data of the cipher key is also exchanged. Data of the cipher key is first subjected to selectable permutation PC-1 (302) by using a table PC-1. Thereafter, data of the cipher key is subjected to selectable permutation PC-2 (304) by using a table PC-2. At the next stage, each set of 28 bits of the cipher key rounded in accordance with an RS table is used.

Figure 4:
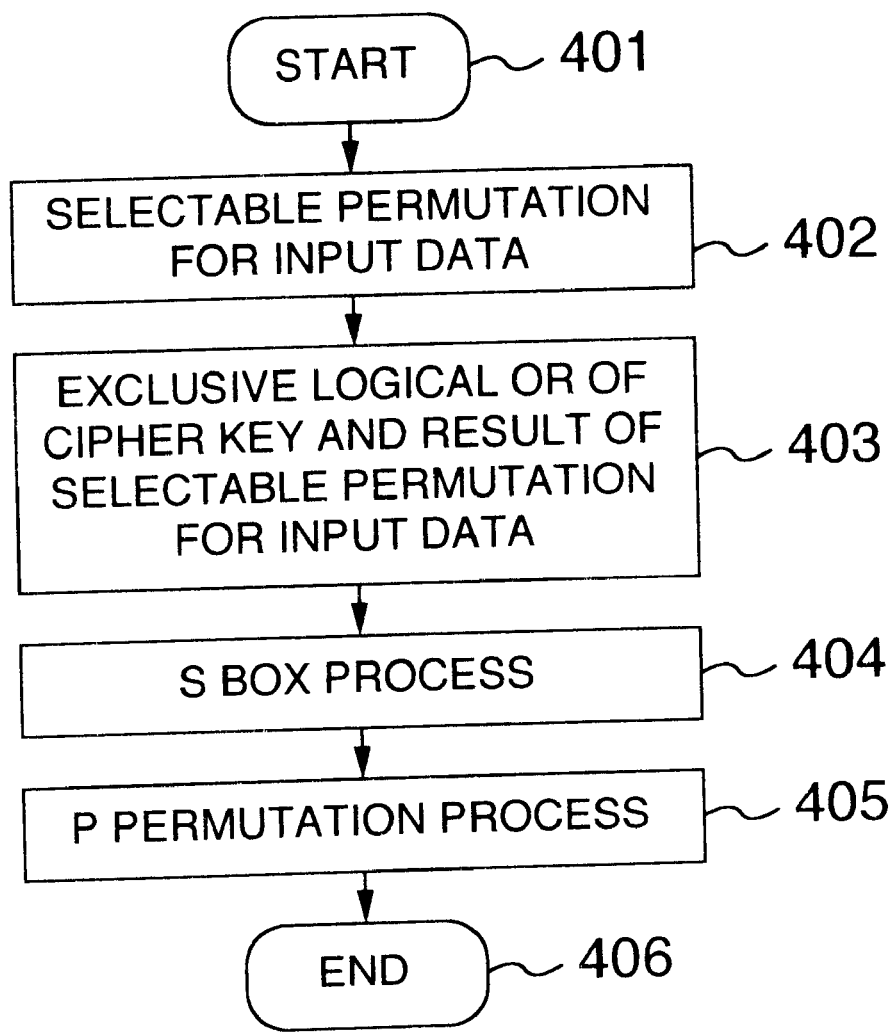
FIG. 4 shows a process flow of an f-function of DES.
Figure 5:
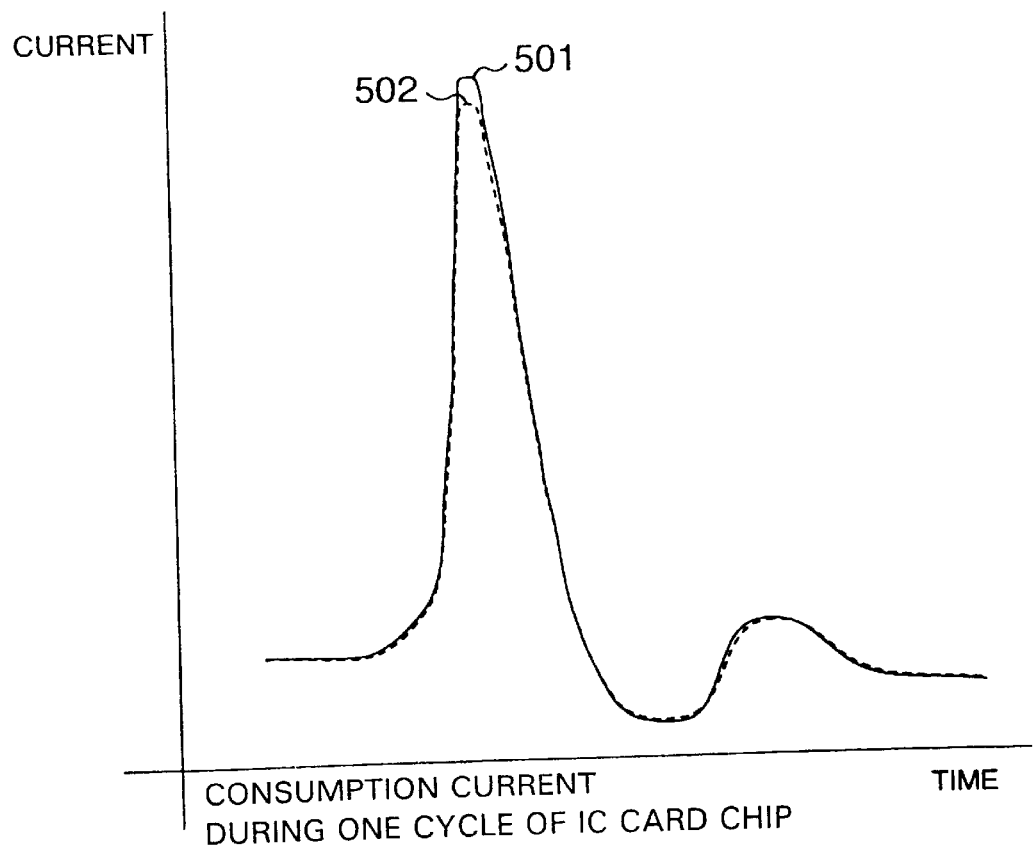
FIG. 5 shows wave shapes of consumption current.

The process by the f function is illustrated in FIG. 4. Data input to the f function is subjected to selectable permutation by using an E selectable permutation matrix (402). Next, an exclusive logical OR is calculated between the cipher key and a result of the selectable permutation for the input data (403), an S box process is executed (404), and a P permutation process is executed (405). In the S box process, each 6-bit set is extracted from 48 bits which is a result of the exclusive logical OR at 403, to acquire the row and column numbers of an S box table and generate 4-bit data. The contents of the S box table change with the position of each 6-bit set. The P permutation process exchanges the bit positions of 32 bits by using a P permutation table.

If the process sequence is the same, a shift in the wave shape of the consumption current changes depending upon data. Therefore, according to the invention, a process randomly changing its sequence at each execution cycle is added to each process shown in FIG. 4.

Figure 24:
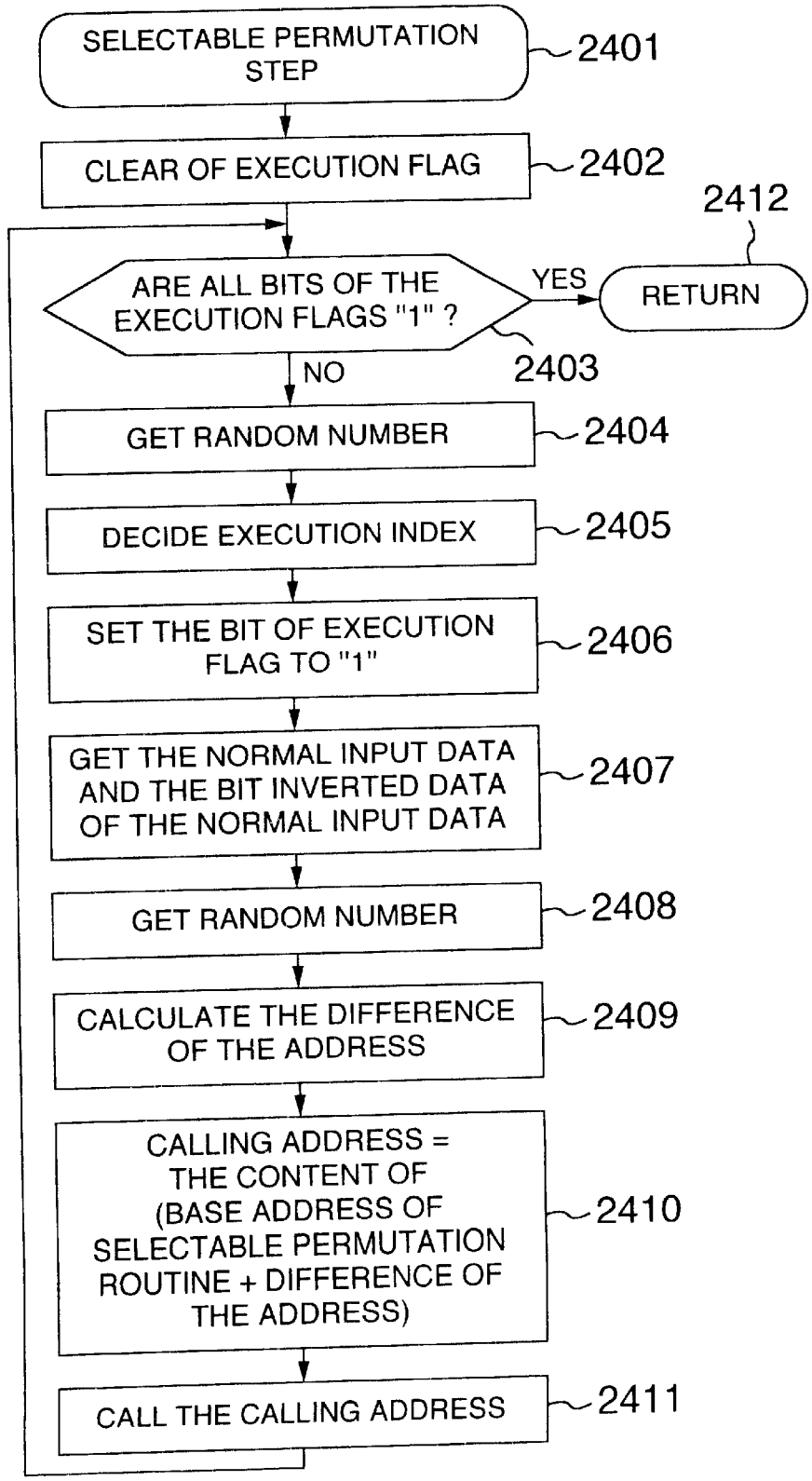
FIG. 24 illustrates a selectable permutation process.

With reference to FIG. 24, the selectable permutation process 402 will be described. The selectable permutation process exchanges the bit positions of data input to the f function by using the E selectable permutation matrix E and expands the input data of 32 bits to 48 bits. The E selectable permutation matrix (2701) is shown in FIG. 27. The 32-nd, 1-st, 2-nd, ..., 32-nd and 1-st bits of the input data as counted from the upper left (2702) to the lower right (2702) are used as 1-st to 48-th output bits.

Figure 6:
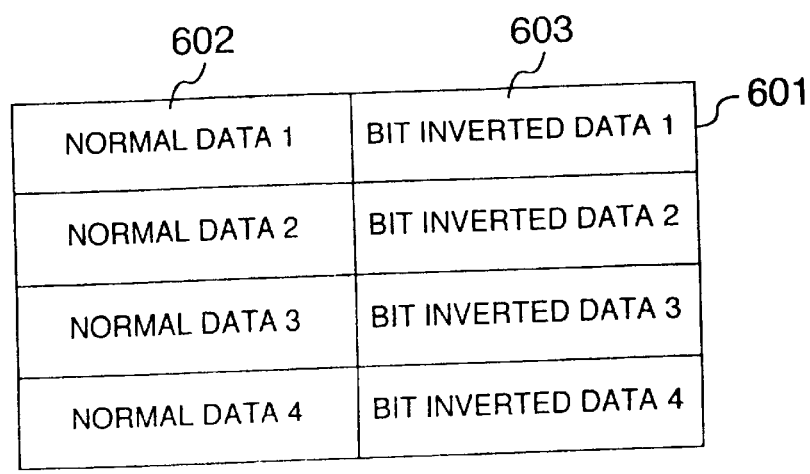
FIG. 6 shows the structures of normal data and bit inverted data.
Figure 7:
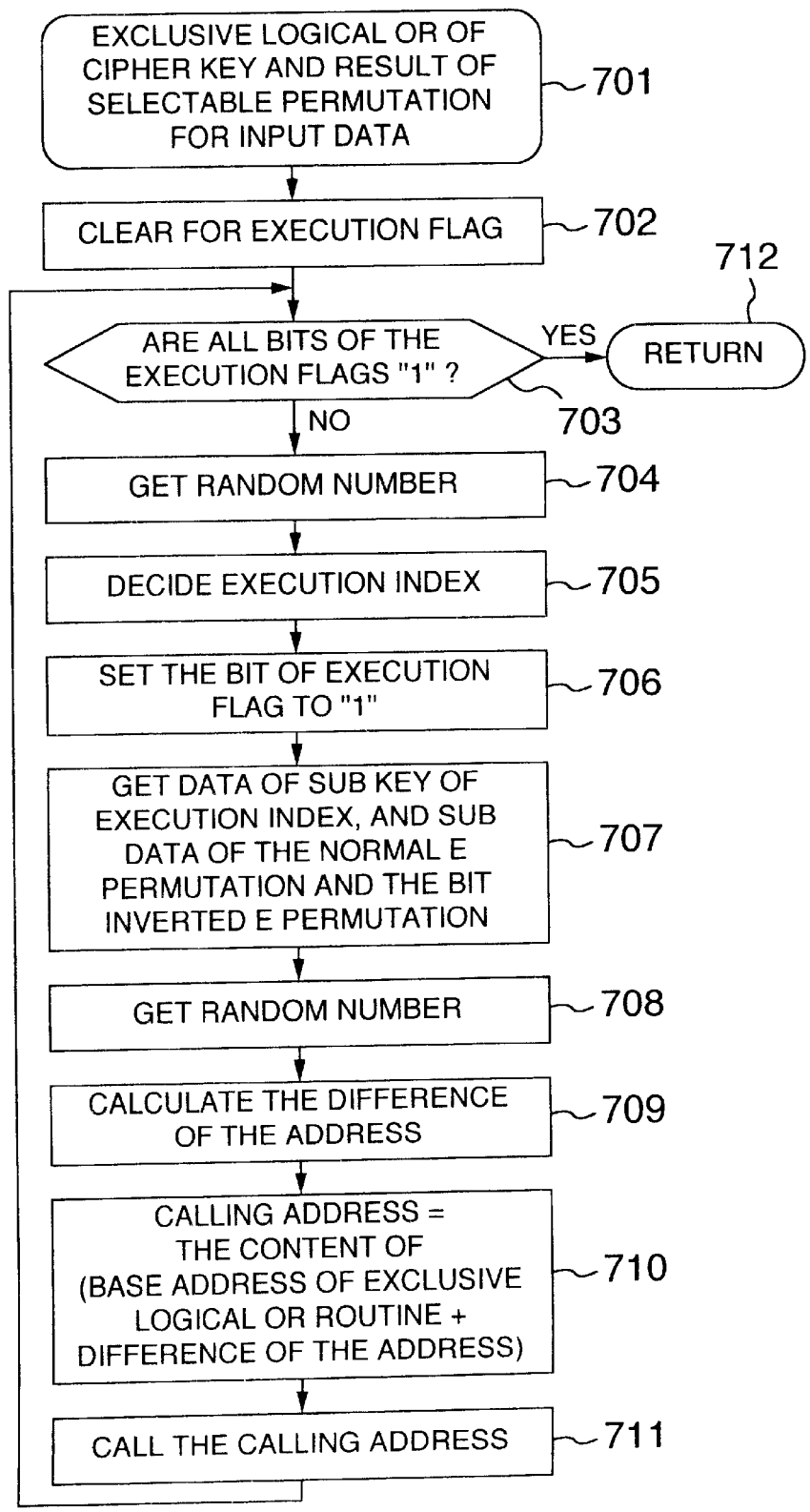
FIG. 7 is a flow chart illustrating an exclusive logical OR of a cipher key and a selectable permutation result.
Figure 8:
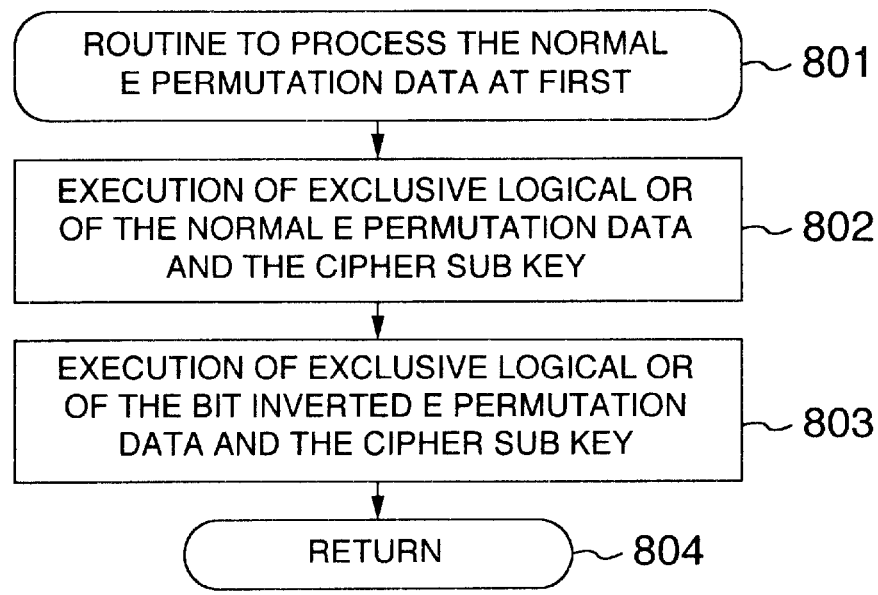
FIG. 8 illustrates a routine of first processing E normal permutation sub-data.
Figure 9:
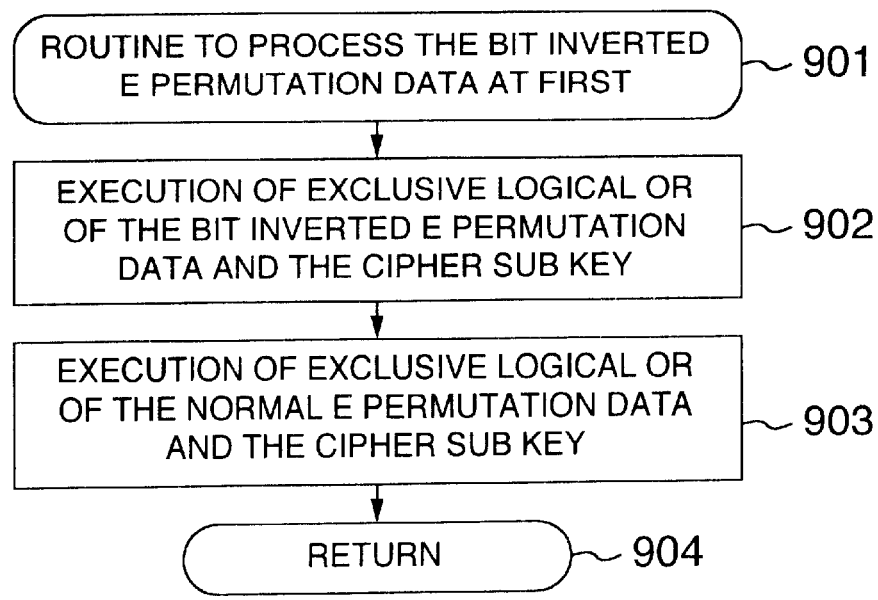
FIG. 9 illustrates a routine of first processing E bit inverted permutation sub-data.
Figure 10:
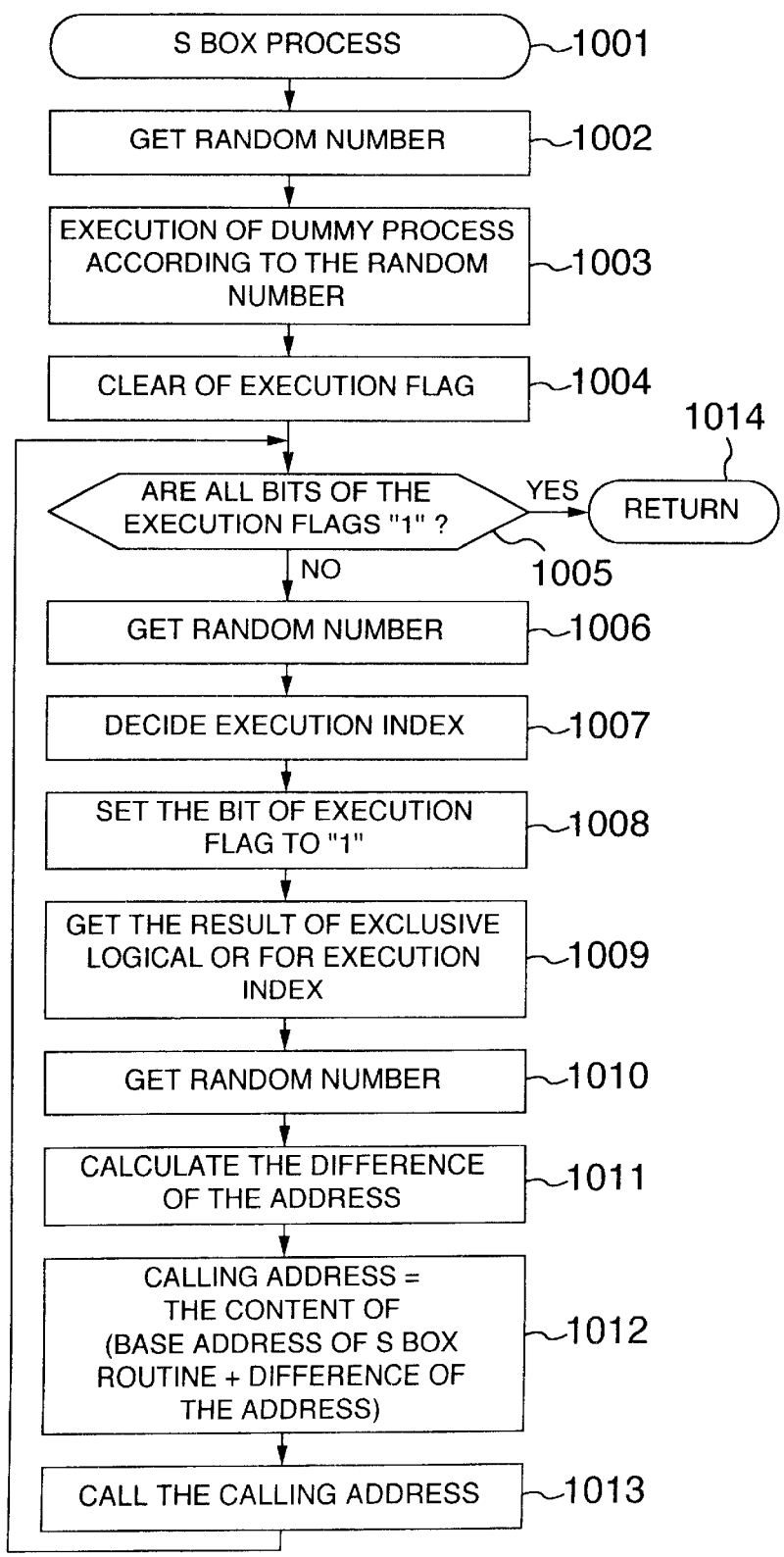
FIG. 10 illustrates an S box process.
Figure 11:
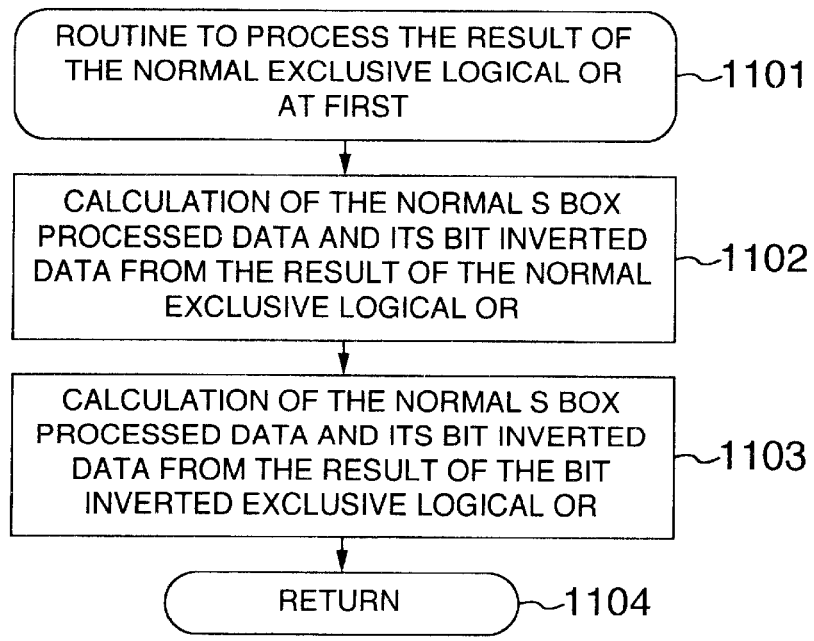
Figure 12:
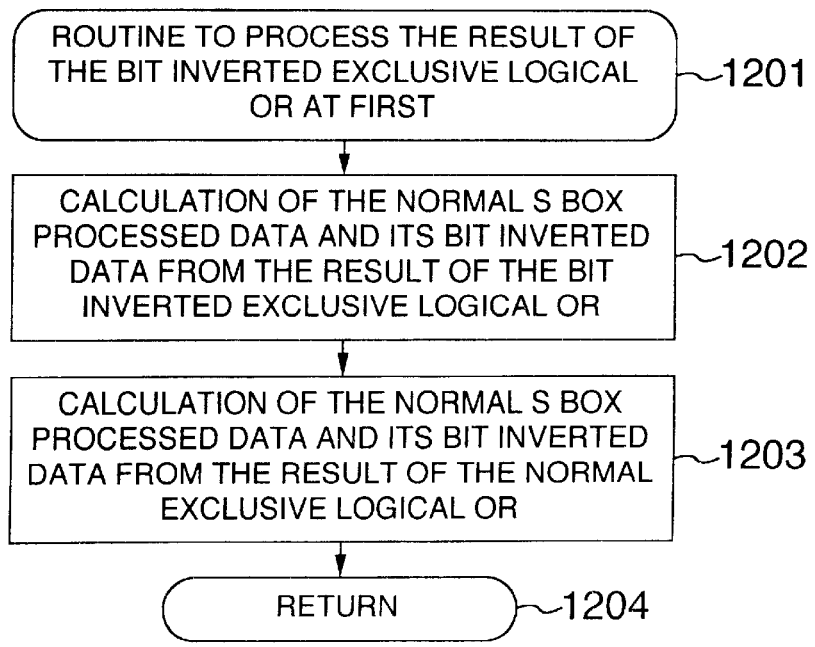

Prior to describing the selectable permutation process, data to be used for the selectable permutation process of this embodiment will be described. As shown in FIG. 6, data is input to the f function as a combination of normal data 602 at the preceding stage and its bit inverted data 603. By inputting such a combination of data, the number of "0" bits and the number of "1" bits are always the same. For example, if the bits of normal data is "00111100", the bits of its bit inverted data becomes "11000011". The number of "0" bits of the combination of the normal data and its bit inverted data is "8", and the number of "1" bits is also "8", i.e., Hamming weights are the same "8". Therefore, if the combination of the normal data and its bit inverted data is transferred to the data bus 203, the dependency of consumption current upon data process will not appear because the numbers of bits "0" and "1" are always the same. For example, if the data bus 203 is a precharge bus, as a preparation for data transfer, the values on the data bus are once changed all to "1" or "0" and thereafter data is transferred. In this case, since the values on the data bus are all the same in the precharged state, the numbers of bits changing from "1" to "0" and from "0" to "1" are always the same during precharging, if the combination of the normal data and its bit inverted data is transferred. Therefore, the dependency of consumption current upon data process is reduced. If the data bus is a static bus providing no precharged state, inversion of each bit is dependent upon the values of preceding data. However, since the Hamming weights of transferred data are always the same, the dependency of current consumption upon transferred data is small. If the normal data only is transferred, the Hamming weights are not always the same so that the consumption current dependency appears. By making the Hamming weights constant by transferring a combination of normal data and its bit inverted data, the dependency of consumption current upon transferred data reduces.

The procedure of the selectable permutation is illustrated in FIG. 24.

The selectable permutation process processes input 32-bit data on a 6-bit unit basis and generates data of 48 bits. The data to be processed includes input normal data and its bit inverted data, and is constituted of two bytes each having 8 bits. The selectable permutation process is generally executed in the arrangement order of the E selectable permutation matrix. However, in this case, since the data process order is always constant, data to be processed may be presumed. In this embodiment, therefore, the execution order is randomized and a dummy process is added randomly so as not to make the execution order constant. With a randomized execution order, the dependency of consumption current upon data process can be reduced.

In the selectable permutation process of this embodiment, execution flags are cleared (2402). This execution flag takes a value "1" if a corresponding bit in each process repetition unit has been processed completely, whereas it take a value "0" if it is not still processed. If all bits of the execution flags are "1", the process is terminated, whereas if not, the process continues to acquire a random number (2404). If the IC card chip has a random number generator, the random number may be supplied from the generator. Alternatively, a pseudo random number may be generated in a software way (refer to "Introduction of Cryptography Theory" by Eiji Okamoto, KYOURITSU Publishing Co., at pp. 61–86).

In order to determine which process is executed in each process repetition unit, an execution index is decided by using a random number (2405). For example, if the E selectable permutation matrix is processed one row after another, the execution index is given by the following formula (1):

$$\text{Execution index} = (\text{random number AND } 0\text{x}07) \% 8 \quad (1)$$

The lower 3 bits of the random number are extracted through an AND product with 0x07 and divided by 8. The remainder is used as the row to be processed. If the E selectable permutation matrix is processed one bit after another, the execution index is given by the following formula (2):

$$\text{Execution index} = (\text{random number AND } 0\text{x}01\text{F}) \% 32 \quad (2)$$

The lower 5 bits of the random number are extracted and divided by 32. The remainder is used as the number of the bit to be processed. Since the execution index is decided by the random number only, the execution order becomes random, and the already processed data is selected in some cases. In this embodiment, such features are positively incorporated in order to reduce the dependence of the wave shape of consumption current upon data process.

Next, the execution flag corresponding to a bit processed is set to "1" (2406). One means for achieving this is the following method. Namely, in the following formula (3), the execution index corresponding to the processed bit is set to "1", and in the following formula (4), an exclusive logical OR between the execution index and execution flag is calculated to set the execution flag of the processed bit to "1".

$$K=1 \text{ is left-shifted by an amount corresponding to the execution index} \quad (3)$$

$$\text{Execution flag} = \text{execution flag } XOR \: K \quad (4)$$

With the above processes, the process repetition unit is selected randomly by using a random number so that the order of process repetition units does not become constant.

Accordingly, the dependency of consumption current upon data process does not appear and a presumption of data process and cipher key becomes difficult. Since the process repetition unit is selected and executed randomly, there is a possibility that the same process is executed twice or more. This makes the process time indefinite so that a presumption of the dependency of consumption current upon data process becomes more difficult.

Next, each process in the process repetition unit selected by the execution index will be described. Each process corresponds to each row process or each bit process for the E selectable permutation matrix. First, in accordance with the execution index, input normal data and its bit inverted data are acquired (2407). In this embodiment, a similar selectable permutation process is executed for both the input normal data and its bit inverted data. In this case, in order not to process the input normal data and its bit inverted data always in the same order, the execution order is randomized. To this end, a random number is acquired (2408) to calculate an address difference (2409). In accordance with this address difference, an address of a called routine is calculated (2410) and the routine is called (2411).

Figure 28:
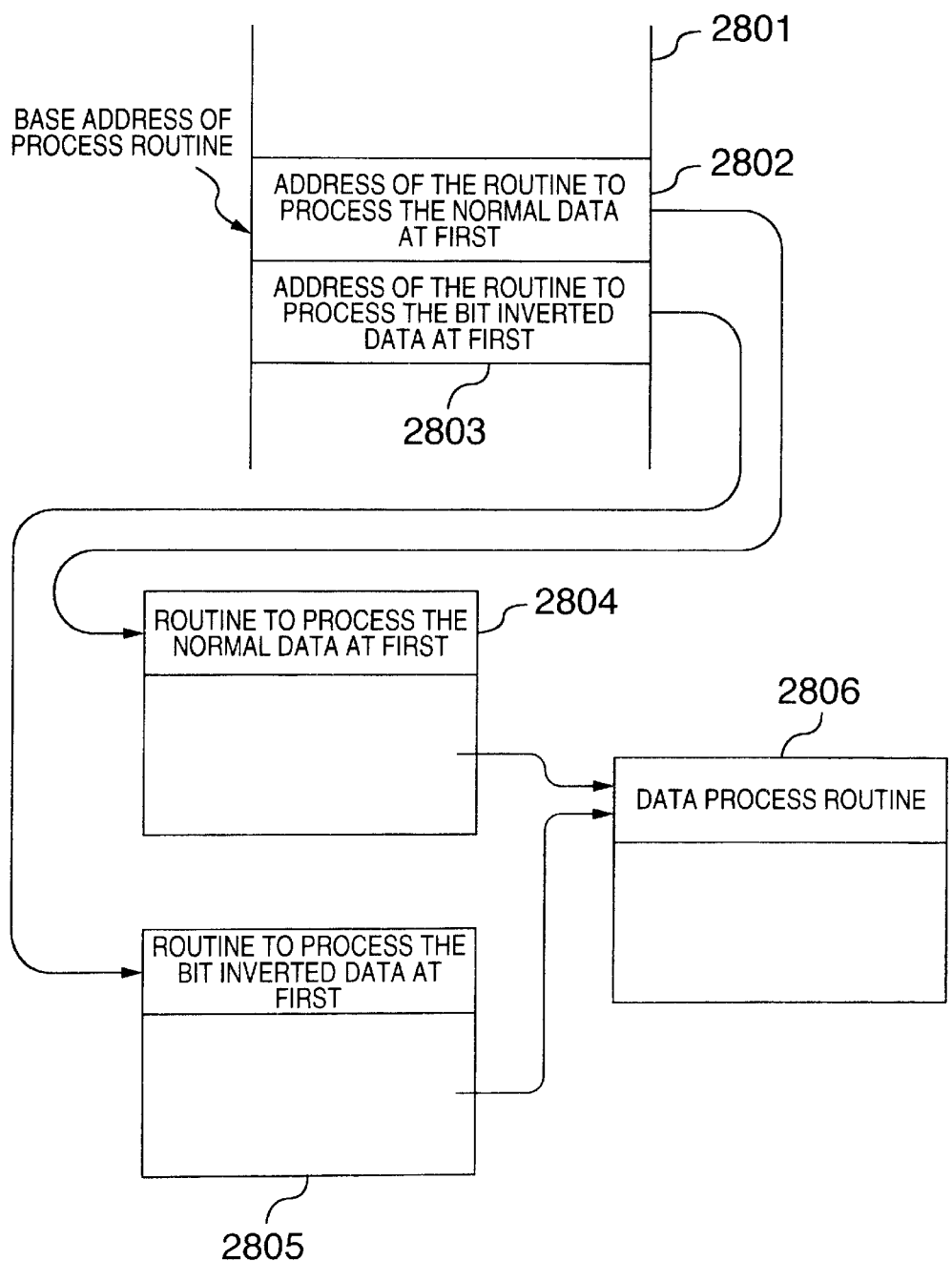
FIG. 28 illustrates a call of a data process routine by using addresses.

An embodiment of calling a data process routine by using the address difference will be described with reference to FIG. 28. An address 2802 of a routine to process the input normal data at first and an address 2803 of a routine to process the bit inverted data at first are stored in a memory 2801. A difference between two addresses is the address difference described above. Assuming that the address storage unit is two bytes, one method of calculating the address different (2409) is as follows.

$$\text{Address difference} = (\text{random number AND } 0\times 01)*2 \quad (5)$$

The least significant bit of a random number is multiplied by 2. The address to be used for calling the routine is obtained by adding the address difference to the base address 2802 of the data area where the selectable permutation routine is written. In this example, as the base address, the address 2802 of the routine to process the normal data at first is written, and the address 2803 of the routine to process the input bit inverted data at first is written at an address of the base address+2 bytes. If the least significant bit of the random number is "0", the address difference is 0 so that the address 2802 of the routine to process the input normal data at first is selected and the routine 2804 to process the input normal data at first is called. If the least significant bit of the random number is "1", the address difference is 2 so that the address 2803 of the routine to process the input bit inverted data at first is selected and the routine 2805 to process the input normal data at first is called.

Since the address difference is calculated by using the random number, the routine to process the input normal data at first and the routine to process the input bit inverted data at first are randomly selected and the input normal data and input bit inverted data are not always processed in the same order. Accordingly, the dependency of consumption current upon the input normal and bit inverted data process can be reduced.

Figure 25:
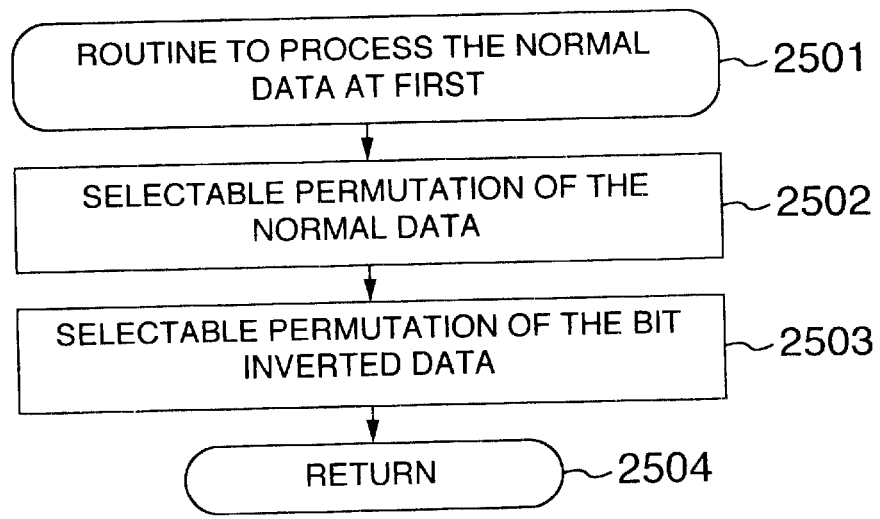
FIG. 25 illustrates a routine of first processing normal input data.
Figure 26:
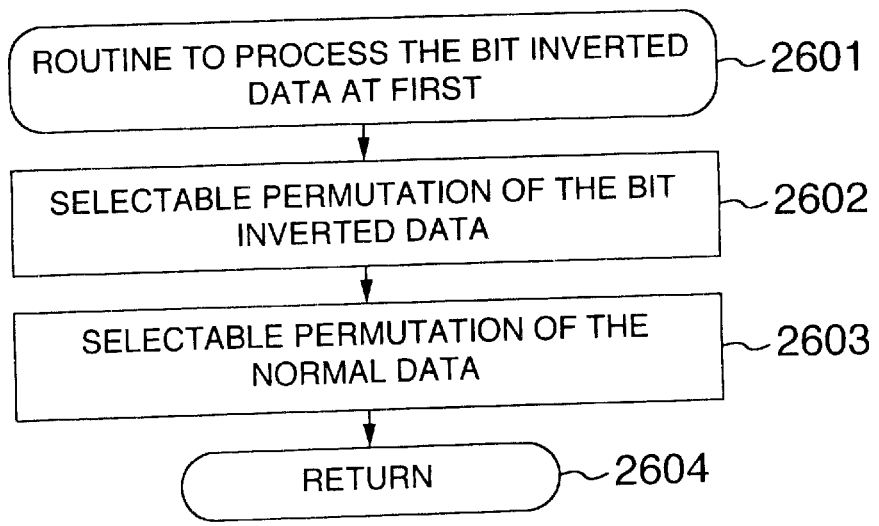
FIG. 26 illustrates a routine of first processing normal input data.

As shown in FIG. 25, in the routine to process the input normal data at first, the input normal data is subjected to a selectable permutation (2502), and then the input bit inverted data is subjected to a selectable permutation (2503). As shown in FIG. 26, in the routine to process the input bit inverted data at first, the input bit inverted data is subjected to a selectable permutation (2602), and then the input normal data is subjected to a selectable permutation (2603). A routine 2806 to execute an actual selectable permutation is called from the corresponding routine to execute a selectable permutation of bits. The selectable permutation (2503 or 2602) for the input bit inverted data generates data by inverting bits of the result of the selectable permutation of the normal data. The reason for this is that since the selectable permutation is the permutation of bit positions, a bit inversion relation between the normal data and bit inverted data can be retained. The normal data and bit inverted data are stored as a combination as shown in FIG. 6 so that the dependency of consumption current upon transferred data can be reduced.

With the above-described processes, each time one data process in the process repetition unit is completed, the flow returns to (2403). If all the data is still not processed, data to be processed is randomly selected by using a random number to repeat the data process. Since data to be processed is selected by using only random numbers, the same data is processed in some cases. Even if the same data is processed twice or more, the selectable permutation poses no problem.

As described above, the input normal data and input bit inverted data used by the selectable permutation of this embodiment are an example of a "combination of normal data and its bit inverted data". The routine to process input normal data at first illustrated in FIG. 25 and the routine to process input bit inverted data at first illustrated in FIG. 26 have a normal data process sequence and a bit inverted data process sequence which sequences are an example of a "normal data instruction and bit inverted data instruction process unit". The routine to process input normal data at first illustrated in FIG. 25 and the routine to process input bit inverted data at first illustrated in FIG. 26 generate a result of selectable permutation of the input normal data and a result of bit inverted normal data, which are an example of a "bit inverted data generation unit. The data process routine 2806 executes the selectable permutation process both for the normal data and its bit inverted data, which is an example of a "normal data and bit inverted data process unit". Steps (2402 to 2405) for randomly changing the process order by using execution flags and random numbers are an example of a "repetitive random execution process unit". Steps (2402 to 2406) for randomly processing twice or more the data already processed by using execution flags and random numbers are an example of a "dummy execution process unit". Steps 2402 to 2406 using execution flags and random numbers realize both a dummy process and a repetitive random process at the same time, which are an example of a "dummy execution and repetitive random execution process unit". A process described with selectable permutation shown in FIG. 24 is a typical example of a "bit unit permutation process unit".

Next, an example of the exclusive logical OR process between input data subjected to selectable permutation and the cipher key will be described. The basic sequence of this process is almost equal to the sequence of the selectable permutation process already described with reference to FIG. 24. A main different point is that the call address at (710) is calculated basing upon the base address of an exclusive logical OR routine. This exclusive logical OR process processes two data sets generated by the selectable permutation process. One data set is normal E permutation data obtained through selectable permutation of input normal data, and the other data set is bit inverted E permutation data obtained through selectable permutation of input bit inverted data. These data sets are stored in the format shown in FIG. 6, and read at the same time as a pair of normal data and bit inverted data. The bit inverted E permutation data is bit inverted data of the normal E permutation data. The normal E permutation data and cipher key both have 48 bits. Since the next S box process is a process to be executed in the unit of 6 bits, the exclusive logical OR process is executed often on the 6-bit unit basis. The exclusive logical OR process may be executed on the 1-bit unit basis. In the former case, the processes (703 to 711) are required to be repeated at least 8 times, and in the latter case, the processes (703 to 711) are required to be repeated at least 48 times.

In a routine to process normal E permutation sub data at first, an exclusive logical OR operation is first executed between the normal E permutation sub data and a cipher sub key (802), and then an exclusive logical OR operation is executed between the bit inverted E permutation sub data and the cipher sub key (803). This execution order is reversed for a routine to process bit inverted E permutation sub data at first (902 and 903).

A result of the exclusive logical OR of the normal E permutation sub data and cipher sub key has a bit inversion relation to a result of the exclusive logical OR of the bit inverted E permutation sub data and cipher sub key. This is because the bit inversion relation is retained through the exclusive logical OR operations between the normal data and bit inverted data and the same cipher sub key.

The routine to process the normal E permutation sub data at first (801) and the routine to process the bit inverted E permutation sub data at first (901) perform the exclusive logical OR operation between normal data and cipher key data and the exclusive logical OR operation between the bit inverted data and cipher key data, which are examples of an "exclusive logical OR process unit" and a "bit inverted data exclusive logical OR process unit".

Next, the S box process (404) will be described. The fundamental sequence of the S box process of this embodiment is similar to the sequence of the selectable permutation process shown in FIG. 24.

First, in order to randomize the start of the S box process, a random number is acquired (1002) to execute a dummy process in accordance with the random number (1003). This dummy process may be a process of repeating a loop without a loop process as many times as the value of the random number. Since the number of loop operations changes with the random number, the start of the S box process becomes random so that the dependency of the wave shape of consumption current upon data process reduces.

Steps (1004 to 1013) of randomizing the process order by using execution flags and random numbers and adding a dummy process are similar to steps 2402 to 2411 of the selective permutation process. The S box process is executed by using an execution result of the exclusive logical OR between the E permutation data and cipher key. An execution result of the exclusive logical OR process (403) between the cipher key and the execution result of the selective permutation are the data containing a pair of normal data and bit inverted data such as shown in FIG. 6. When an execution result of the exclusive logical OR between data indicated at the execution index is acquired, a pair of data is acquired in the manner similar to the process described earlier. A routine (1101) to process an execution result of the normal exclusive logical OR at first and a routine (1201) to process an execution result of the bit inverted exclusive logical OR at first are randomly called by using random numbers.

In the S box process, an address of the S box table is calculated for each set of six bits of the execution result of an exclusive logical OR (1702), to obtain 4-bit data which is a result of the conversion result by the S box (1703). In calculating the address, a row number is calculated from two bits of the first and second bits of the input 6 bits, and the column number is calculated from four bits of the second to fifth bits.

There are eight S box tables. Each S box table is used for the conversion of 6 bits which are a result of the exclusive logical OR. In a general first S box table 2901, the first to fourth columns and the first to fourth rows have data such as shown in FIG. 29. In this embodiment, as shown in FIG. 30, the S box table is expanded so as to obtain also bit inverted data. Although the display range of the S box table shown in FIG. 30 is the same as that shown in FIG. 29, each element of the S box table shown in FIG. 30 is expanded to two fields. The first field (left field, e.g., a field 3004) stores data in the corresponding element of the S box table shown in FIG. 29, and the second field (right field, e.g., a field 3005) stores bit inverted data in the first field.

In the routine (1101) to process the execution result of the normal exclusive logical OR, normal S box process data and bit inverted S box process data are obtained from the execution result of the normal exclusive logical OR by using the expanded S box table (1102). Next, normal S box process data and bit inverted S box process data are obtained from the execution result of the bit inverted exclusive logical OR by using the expanded S box table (1103). Since the S box process is executed by using the execution result of the bit inverted exclusive logical OR, the result of the process (1103) is not used. However, in order to reduce the dependency of consumption current upon data process, it is executed as a dummy process. The execution order of the above processes is revered in the routine (1201) to process the execution result of the bit inverted exclusive logical OR, and similarly the result of the bit inverted exclusive logical OR, i.e., normal S box process data and bit inverted S box process data, are not used. Data to be passed to the next P permutation process is the execution result of the normal exclusive logical OR, i.e., the normal S box process data and bit inverted S box process data.

In order to obtain the normal S box process data and bit inverted S box process data from the execution results of the exclusive logical OR by using the expanded S box table, an address of the S box table is first calculated from 6 bits which are the execution result of the exclusive logical OR (1702). Next, the normal S box process data is obtained from the first field of the expanded S box table (3001) and the bit inverted S box process data is obtained from the second field (1703).

The normal S box process data and bit inverted S box process data obtained during the S box process are an example of the "combination of normal data and its bit inverted data". The process (1703) of acquiring the normal S box process data and bit inverted S box process data by using the expanded S box table 3001 is an example of the "bit inverted data generation unit. The processes (1103 and 1202) of obtaining the S box conversion result from the execution result of the bit inverted exclusive OR, i.e., the normal S box process data and bit inverted process data, by using the S box table, process not the normal data but the bit inverted data so that both the normal data and bit inverted data can be processed in the similar manner and the dependency of consumption current upon data process can be reduced. These processes are an example of the "normal data instruction and bit inverted data instruction process unit". The S box process is an example of a substitution process in the unit of 6 bits and not in the unit of 1 bit. The routine (1101) to process the execution result of the normal exclusive logical OR at first or the routine (1201) to process the execution result of the bit inverted exclusive logical OR at first are an example of a process of substituting the normal data, obtaining the substitution result and bit inverted data, substituting the bit inverted data, and obtaining the substitution result and bit inverted data.

Figure 13:
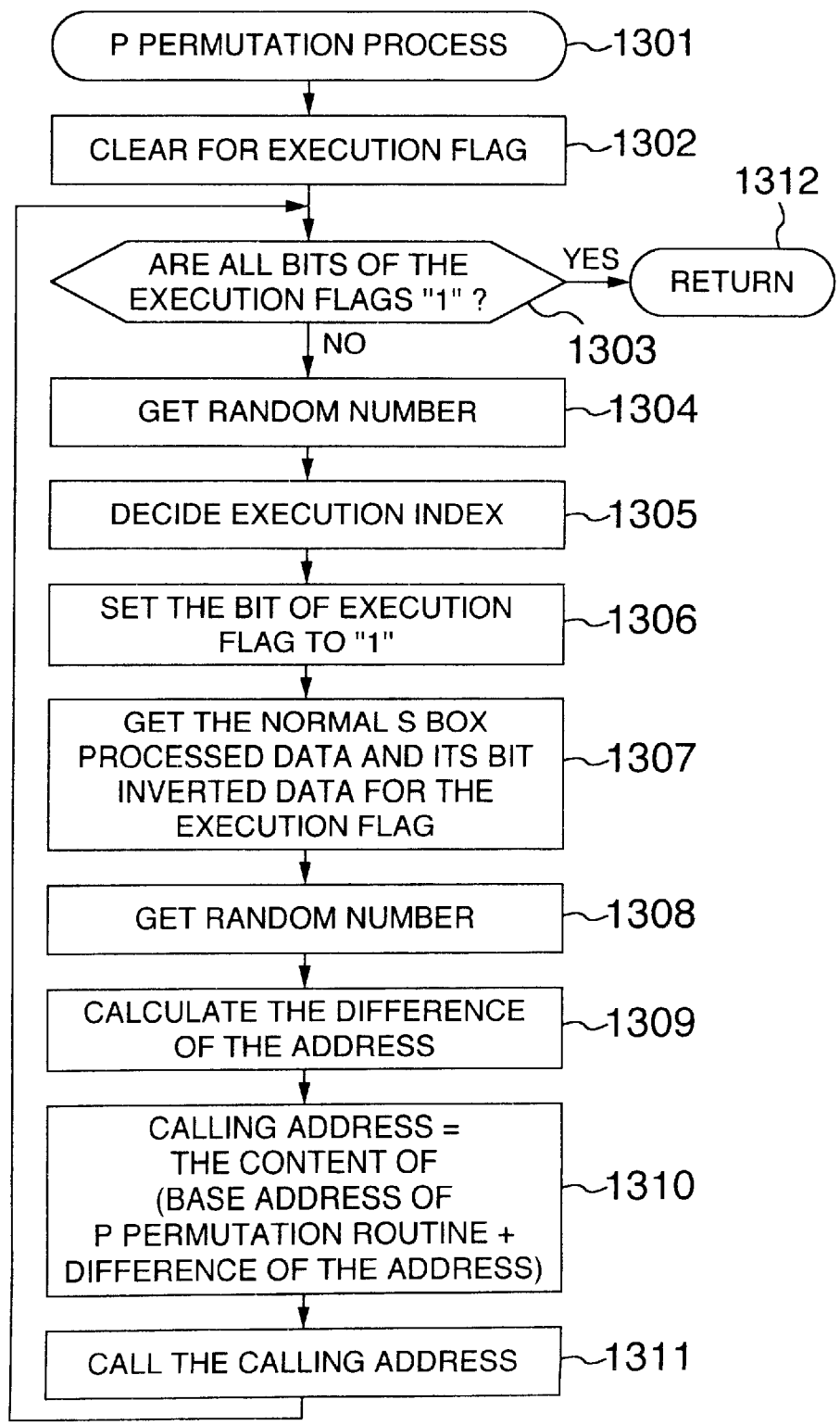
FIG. 13 illustrates a P permutation process.
Figure 14:
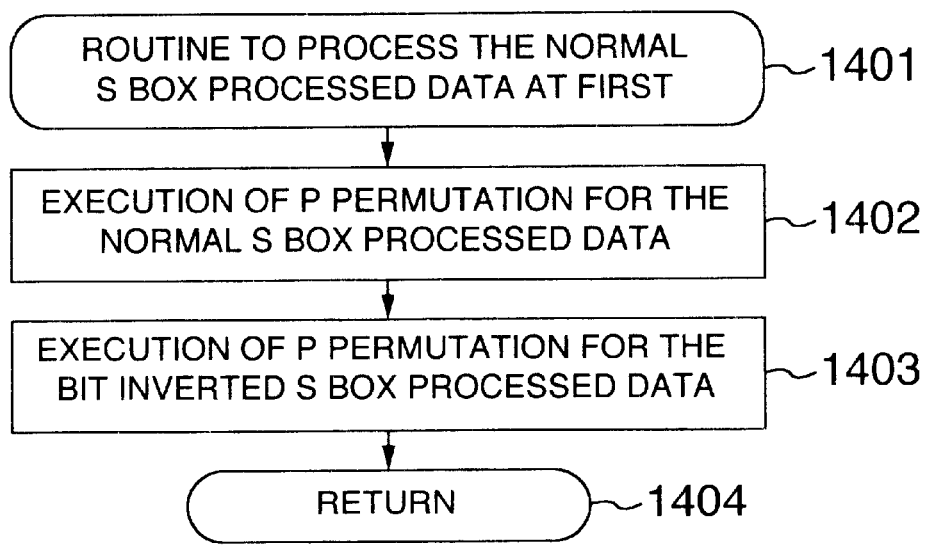
FIG. 14 illustrates a routine of first processing normal S box process data.
Figure 15:
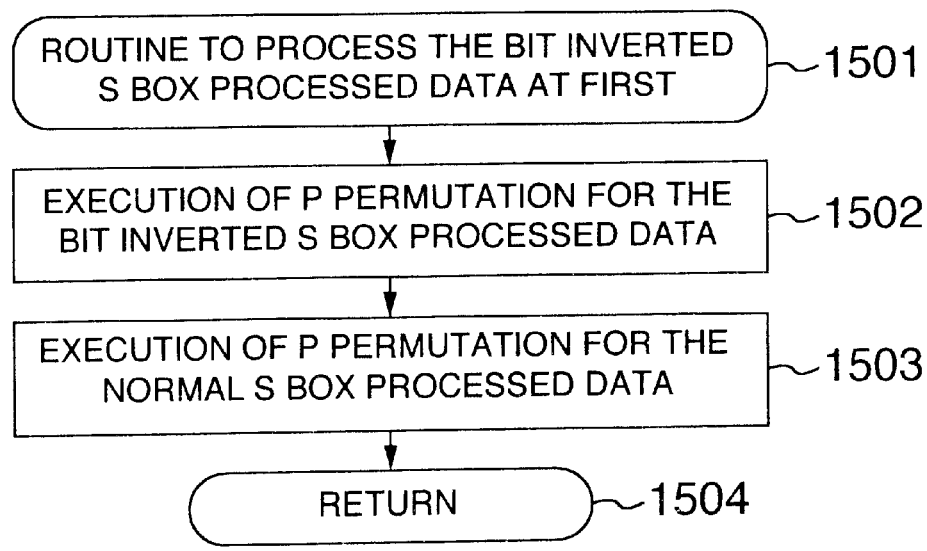
FIG. 15 illustrates a routine of first processing bit inverted S box process data.
Figures 16, 17:
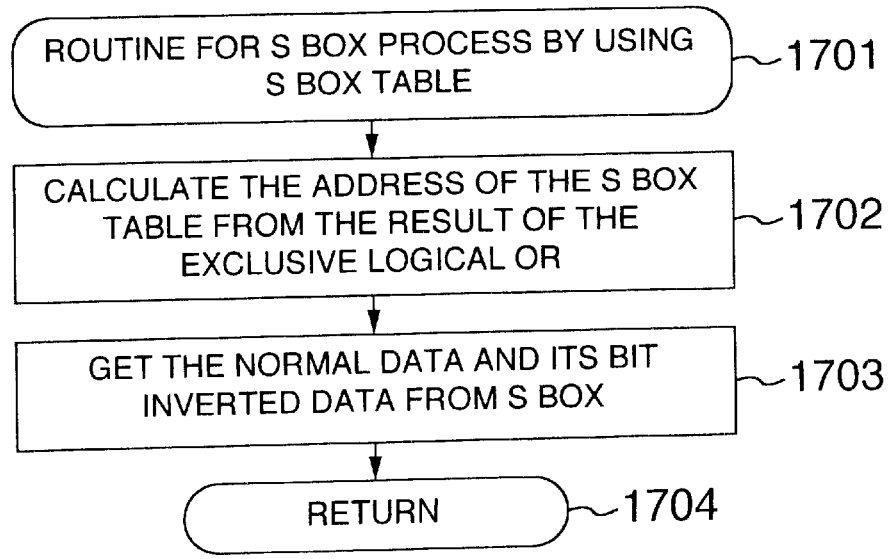
FIG. 16 shows a P permutation matrix.
FIG. 17 illustrates a routine of an S box conversion process using an S box table.

The P permutation process (405) will be described with reference to FIG. 13. The P permutation process is similar to the selectable permutation process (2401). The different point is a use of a P permutation matrix 1601 shown in FIG. 16.

The normal S box process data and bit inverted S box process data in the format shown in FIG. 6 are supplied as the execution result of the S box process. In a routine (1401) to process the normal S box data at first, P permutation is executed for the normal S box process data (1402), and then P permutation is executed for the bit inverted S box process data (1403). The execution order of these processes is reversed for a routine (1501) to process the inverted bit S box data at first. Since the P permutation exchanges the bit positions, the bit inverted P permutation process data as the process result of the bit inverted S box process data has a bit inversion relation to the normal P permutation process data as the process result of the normal S box process data.

Examples of the f function processes (402 to 405) have been described above. In this embodiment, the order of data processes is randomized, a dummy process is added, and the normal data and bit inverted data are used. It is therefore possible to make it difficult to presume the dependency of current consumed by the IC card chip upon data process and to presume the cipher key by measuring the wave shape of the consumption current.

Next, an embodiment for RSA will be described. RSA is a cryptographic algorithm utilizing a difficulty in prime factoring. Since different keys are used for enciphering and deciphering, this algorithm is called an anti-symmetric algorithm. For both the enciphering and deciphering, the following modular exponentiation calculation is used.

$$y = x^{**}e \bmod n \qquad (6)$$

An equation "a=b mod n" means that (a−b) can be divided out by n. In the deciphering, x represents a cipher text, e represents a secret key, and y represents a deciphered plain text. The modular exponentiation calculation can be made by using modular multiplications. Some IC cards have a co-processor capable of calculating modular multiplication in order to calculate modular exponentiation at high speed. A modular multiplication is given by:

$$y = a*b \bmod n \qquad (7)$$

Figure 18:
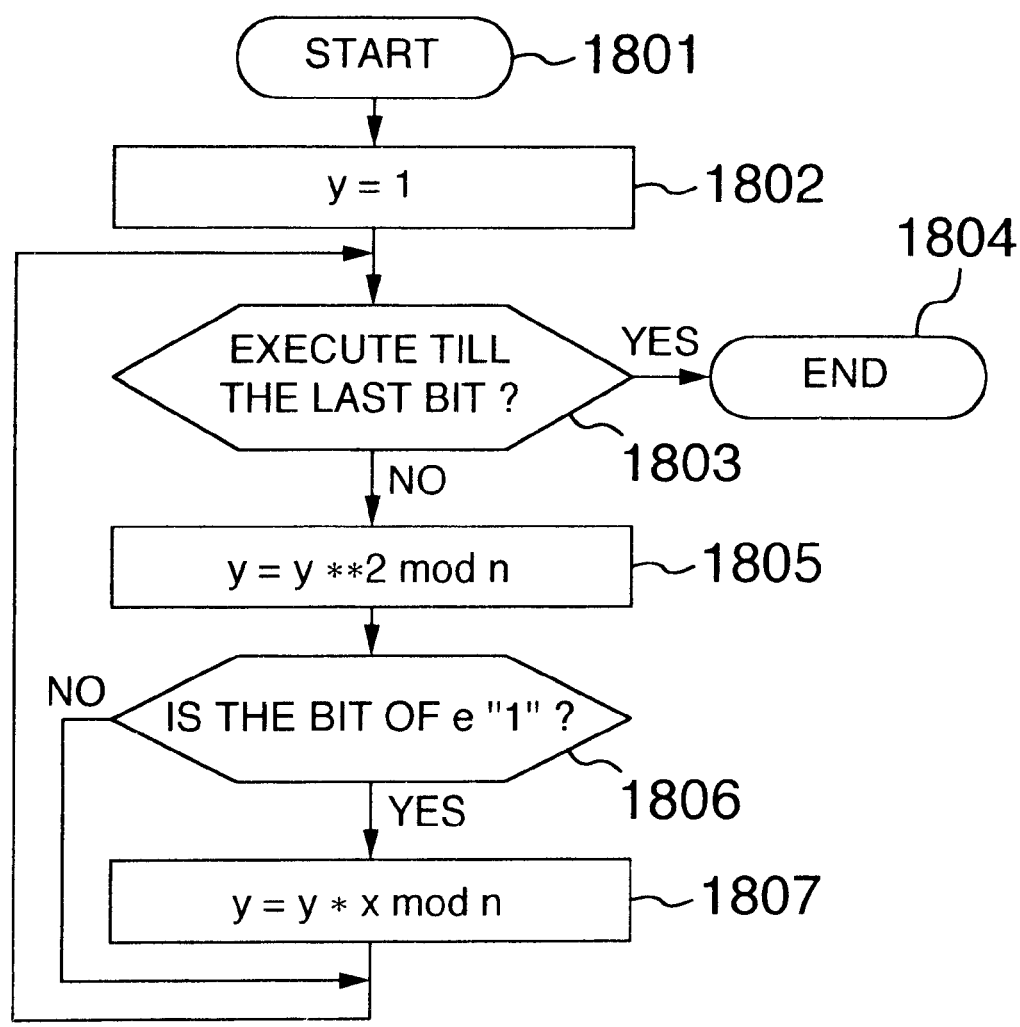
FIG. 18 illustrates a process routine of RSA.

A method of calculating modular exponentiation by using modular multiplication is illustrated in FIG. 18. This calculation method is described, for example, in "Introduction of Cryptography Theory", by Eiji Okamoto, KYOURITSU Publication Co., at page 94. A binary expansion of an integer of the secret key e is given by e=e0, e1, e2, . . . , e(w−1). The binary expansion results (hereinafter called bits of e) are a binary bit train representing e. The value y is initialized to "1" (1802), a modular second power calculation of y raised to the second power is performed using a modulus n, starting from the most significant bit of e (1805), and if the value of the corresponding bit is "1", then a modular first power calculation of y multiplied by x is performed using the modulus n (1807). If the value of each bit is "0", the process (1807) is skipped. The processes (1805 to 1807) are repeated from the most significant bit to the least significant bit.

In the process sequence shown in FIG. 18, if the bit of e is "1", the co-processor operates twice, whereas if the bit of e is "0", it operates only once. The secret key e can therefore be estimated by monitoring the operation of the co-processor. If the number of operations of the co-processor is made the same irrespective of the positions of bits of binary expansion of e, it becomes difficult to presume the secret key by monitoring the operation of the co-processor.

Figure 19:
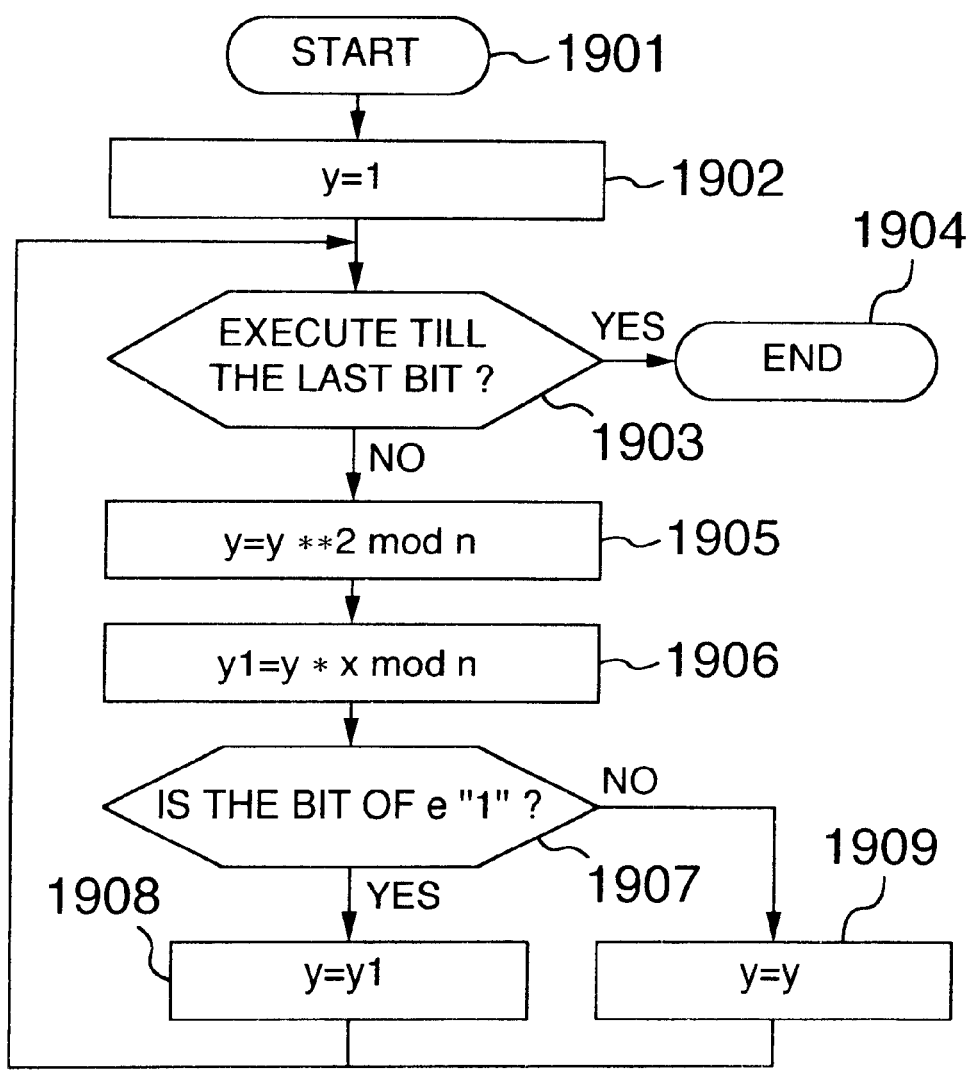
FIG. 19 illustrates a process routine of RSA in which a modular multiplication process is performed independently from the value of bit of a cipher key.

FIG. 19 illustrates the process sequence of modular exponentiation capable of making difficult to presume a secret key by using the same number of operations of a co-processor for each bit. In this embodiment, irrespective of the values of bits of the secret key e, a modular first power multiplication of y multiplied by x is performed (1906). If the value of bit of e is "1", the calculation result is substituted to y (1908), whereas if not, the calculation result of y is used as it is (1909). The process is repeated to reach the least significant bit. In this embodiment, since the number of operations of the co-processor is the same irrespective of the value of bit of e, the values of bits of the secret key e cannot be identified even if the operation of the co-processor is monitored from the wave shape of consumption current. A modular multiplication unit is realized by the process (1906) and a modular multiplication process result selection unit 1907 is realized by the processed (1907 to 1909).

Figure 20:
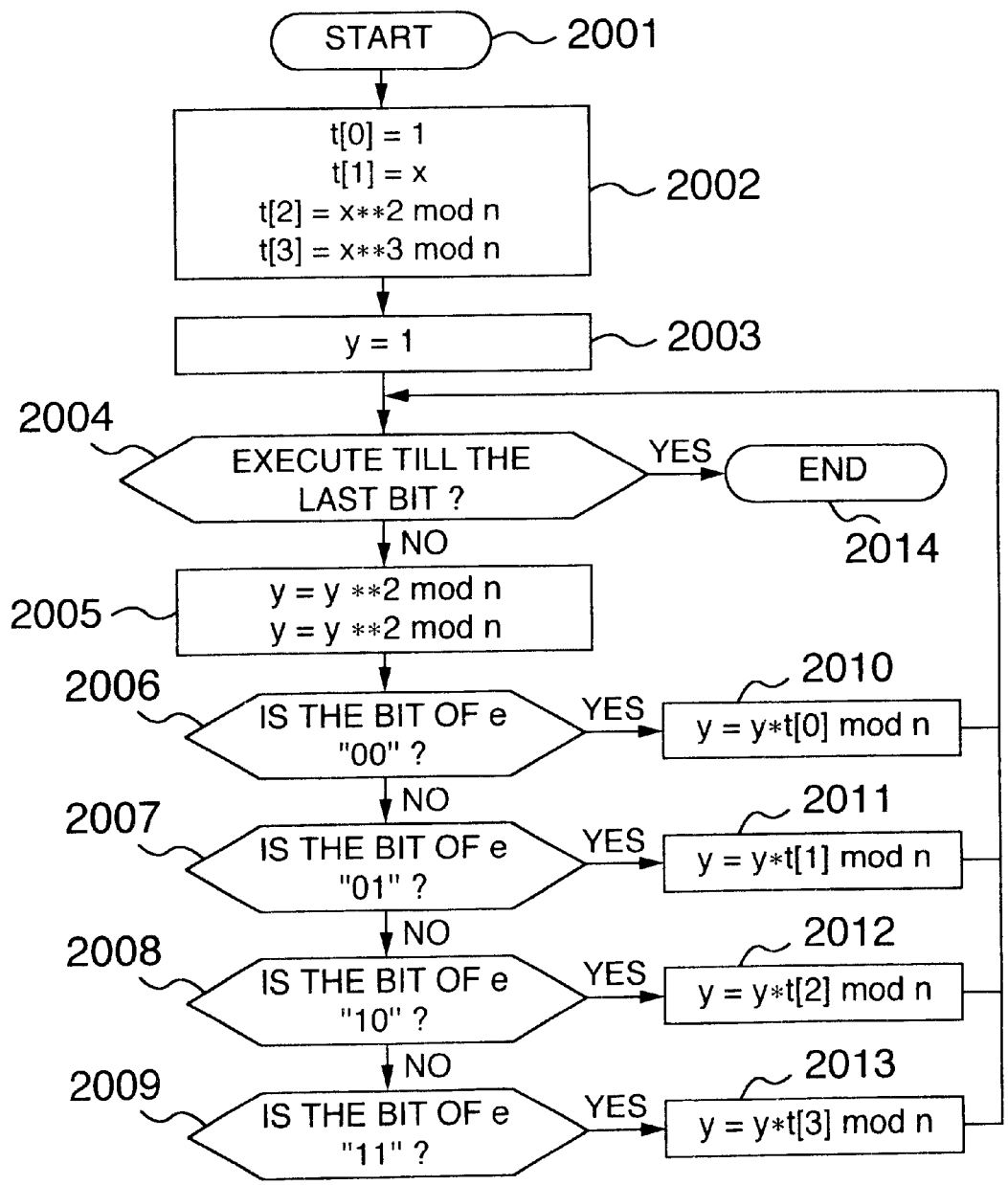
FIG. 20 illustrates a routine of RSA on the two-bit process basis.

A method of calculating the modular exponentiation calculation shown in FIG. 19 at high speed is illustrated in FIG. 20. This method utilizes a method called an addition chain method described in "Introduction of Cryptography Theory", by Eiji Okamoto, KYOURITSU Publication Co., at page 95. The method illustrated in FIG. 19 processes data in the unit of one bit of e, whereas the method illustrated in FIG. 20 processes data in the unit of a plurality of bits of e. The method shown in FIG. 20 processes data in the unit of 2 bits. First, the cipher texts x raised to the 0-th, 1-st, 2-nd and 3-rd powers are calculated (2002). Next, y is initialized to "1" (2003). If the last bit is not still processed (2004), the quadratic residue calculation is executed twice. This operations correspond to shifting the value y to the upper digits by two bits. In accordance with the upper two bits of e, the processes (2010 to 2013) are selectively performed respectively for the values of upper two bits of "00", "01", "10" and "11". In each process, a modular first power multiplication of y storing the intermediate modular multiplication result and multiplied by a corresponding value of t[0] to t[3] is executed, in accordance with each value of two bits of e. For example, the process (2012) is executed for the value "10" of two bits of e, and y is multiplied by t[2] which stores the quadratic residue of x. Until the last bit is processed, the processes (2004) to (2013) are repeated. If the last two bits of e contain only one bit, the method illustrated in FIG. 18 or 19 is performed.

In the method shown in FIG. 20, irrespective of which value the two bits of e have, the co-processor operates twice at the process (2005) and once at one of the processes (2010 to 2013), three times in total. It is therefore difficult to presume the bits of e by simply monitoring the operation of the co-processor. In the method shown in FIG. 19, the co-processor operates twice to process one bit, whereas in the method shown in FIG. 20, the co-processor operates three times to process two bits, i.e., 1.5 times per one bit. Therefore, the two-bit method shown in FIG. 20 is faster about 25% than the one-bit method shown in FIG. 19. The reason why the process time is proportional to the number of operations of the co-processor, is because the processes shown in FIGS. 20 and 19 require the co-processor operation to take a large portion of the process time.

However, the same values of t[0] to t[3] are used at each of the processes (2010 to 2013) to process the two bits of e. Therefore, there is a possibility of presuming the bits of e if the dependency of the wave shape of consumption current upon data process appears.

In this invention, the values of t[0] to t[3] are changed at the intermediate stage of the modular exponentiation to reduce the dependency of the wave shape of consumption current upon data process. An embodiment of this will be described with reference to FIG. 21. A different point of the method shown in FIG. 21 from that shown in FIG. 20 is an addition of processes (2105 and 2106). In the embodiment shown in FIG. 21, during the repetitive processes of the modular exponentiation of two bits of e, the values to t[i] are changed each time the number of repetitions reaches a certain fixed number. In the process (2105), it is checked whether the number of repetitions reaches the fixed number, and if reaches, the values of t[i] are changed. The fixed number at the process (2105) may be the value obtained by dividing the number of digits of e by "20". Since the 2-bit method is used, this means the values of t[i] are changed 10 times. The values of t[i] may be changed when an arbitrary digit or lower digits are processed. There are many methods of changing the values of t[i]. The feature of the invention resides in changing the values of t[i] during repetitive processes during the modular exponentiation. In the process (2106), each value of t[i] is changed by adding a value obtained by multiplying the modulus n of modular calculation by a random number. This can be realized as in the following.

$$r = \text{random number} \tag{8}$$

$$t[i] = t[i] + r*n \tag{9}$$

In the corresponding one of the processes (2112 to 2115), the modular multiplication of y multiplied by the changed t[i] is executed using the modulus n as in the following.

$$\begin{aligned} y &= y * t[i] \bmod n \\ &= y * (t[i] + r * n) \bmod n \\ &= y * t[i] \bmod n + r * n \bmod n \\ &= y * t[i] \bmod n \end{aligned} \tag{10}$$

As seen from this equation, the term (r*n) is eliminated because (r*n mod n) is zero, i.e., (r*n) can be divided out by n. Since the values of t[i] used by the processes (2112 to 2115) are changed each time the fixed number of repetitive processes is executed, the dependency of consumption current upon data process can be reduced. The process (2102) corresponds to a "modular exponentiation calculation process unit" for input data corresponding to a bit value, and the processes (2108 to 2115) correspond to a "modular multiplication calculation unit" of input data corresponding to each bit. The processes (2105 and 2106) are realized by a "modular exponentiation change process unit" for input data corresponding to a bit value. A "modular exponentiation value change process unit" for input data corresponding to a bit value in which an integer multiple of the modulus of the modular calculation is added to the modular exponentiation value of input data corresponding to the bit value, is realized by the process (2106).

As another example of the "modular exponentiation change process unit" for input data corresponding to a bit value, there is a method of using "2" raised to an arbitrary power r as the value to be multiplied by the modulus of the modular calculation. By using "2" raised by the power r, a calculation of multiplying the modulus by "2" raised to the power r can be made easy. Multiplying the modulus N by "2" raised to the power r is equivalent to shifting the modulus N by r bits to the left. Generally, since the modulus takes an integer of 100 bits to 1000 bits, it takes a long process time to multiply the modulus N by a random number r. A shift operation is much faster than multiplication. If a multiplication of 2 raised to the 8-th power is used instead of a multiplication of 2, the 8-bit shift or one-byte shift is used instead of one-bit shift and can be performed at higher speed. This is because the left shift by one byte corresponds to moving the data by one byte to the left, and can be realized by a data move instruction not by a shift instruction.

Another embodiment of the method of changing the values t[i] will be described with reference to FIG. 22. In the method shown in FIG. 22, the values of t[i] are changed by executing a modular exponentiation of t[i] multiplied by a certain value as in the following.

$$t[i] = t[i]*v \bmod n \tag{11}$$

With this method, when the modular exponentiation is completed, an inverse number to a value of the multiplied value of the modulus n is multiplied to obtain the original value.

$k$ = the number of times during modular exponentiation through multiplication by $v$ (12)

$$s = u^{**}k \bmod n \tag{13}$$

$$y = y*s \bmod n \tag{14}$$

where $u*v \bmod n = 1$ (15)

This method obtains the original value by multiplying u by the number of times during modular exponentiation through multiplication by v, as in the following.

$$\begin{aligned} y &= y * v ** k \bmod n \\ y &= y * u ** k \bmod n \\ &= y * v ** k * u ** k \bmod n \\ &= y * (v * u) ** k \bmod n \\ &= y \bmod n * (v * u) ** k \bmod n \\ &= y \bmod n * ((v * u) \bmod n) ** k \bmod n \\ &= y \bmod n * 1 \bmod n \\ &= y \bmod n * 1 \\ &= y \bmod n * \end{aligned} \tag{16}$$
$$\tag{17}$$

Since v is multiplied during modular exponentiation, y takes a value of modular exponentiation value of y multiplied by v by using the modulus k. y takes a value of modular exponentiation of y multiplied by u by using the modulus k, which results in y mod n by using the equation (15).

The process sequence will be described with reference to FIG. 22. Through modular calculation using the modulus n, v and its inverse u are obtained in a process 2204. In a process (2207), v is modified so as not to use the fixed v. One method of modifying v is to obtain a random number and perform a modular exponentiation of v by using the random number as the modulus. Another method is to increase the number of modular exponentiations of v each time repetitive processes exceeds a certain fixed value. A modular multiplication of t[i] multiplied by the modified v is executed (2208). If all bits of e are processed, a calculation of invalidating v is executed by using u to obtain correct values of y (2218). If n is known in advance or a predetermined random number is used, s indicating the modular exponentiation of u multiplied by the number of times during multiplications by v can be calculated in advance. By using this value s, the original values of y can be calculated as in the following.

$$y = y*s \bmod n \tag{18}$$

This operation is similar to the equation (17).

The processes 2204, 2207 and 2208 are realized by a "modular exponentiation result change process unit for performing a modular exponentiation of the modular exponentiation result multiplied by v or v raised to a certain power among two values u and v whose molecular multiplication by using the modulus in the modular calculation is 1". The process 2218 is an example of an "inverse process unit".

Next, an example of the process to be executed by the inverse process unit at the intermediate stage of calculation bits of e not after the calculation of all bits of e will be described with reference to FIG. 23. In the processes shown in FIG. 23, processes (2307 to 2317) are the same as those processes (2207 to 2217) shown in FIG. 22. A process (2318) corresponding to the process 2218 is executed after the process (2314 or 2317). For example, after the modular multiplication of t[i] multiplied by v is executed, if this operation is to be canceled each time, the following equation is performed.

$$y=y*u \bmod n \tag{19}$$

This is because y multiplied by t[i] at the processes (2314 to 2317) equals to the original t[i] multiplied by v.

$$\begin{aligned}
t[i] &= t[i] * v \bmod n & (20)\\
y &= y * t[i] \bmod n & (21)\\
  &= y * t[i] * v \bmod n &\\
y &= y * u \bmod n & (22)\\
  &= y * t[i] * v * u \bmod n &\\
  &= y * t[i] \bmod n &
\end{aligned}$$

In the process (2308), t[i] is modified as shown by the equation (20), and in the processes (2314 to 2317) the equation (21) is calculated. By using this calculation result, the equation (22) is calculated in the process (2318) to drive the original equation.

In order to calculate more efficiently, each time the modification by v is not removed, but is removed at a predetermined cycle pitch. In this case, as the value u in the equation (19), the value representative of the number of modifications by v is selected and the equation (19) is calculated.

Figure 23:
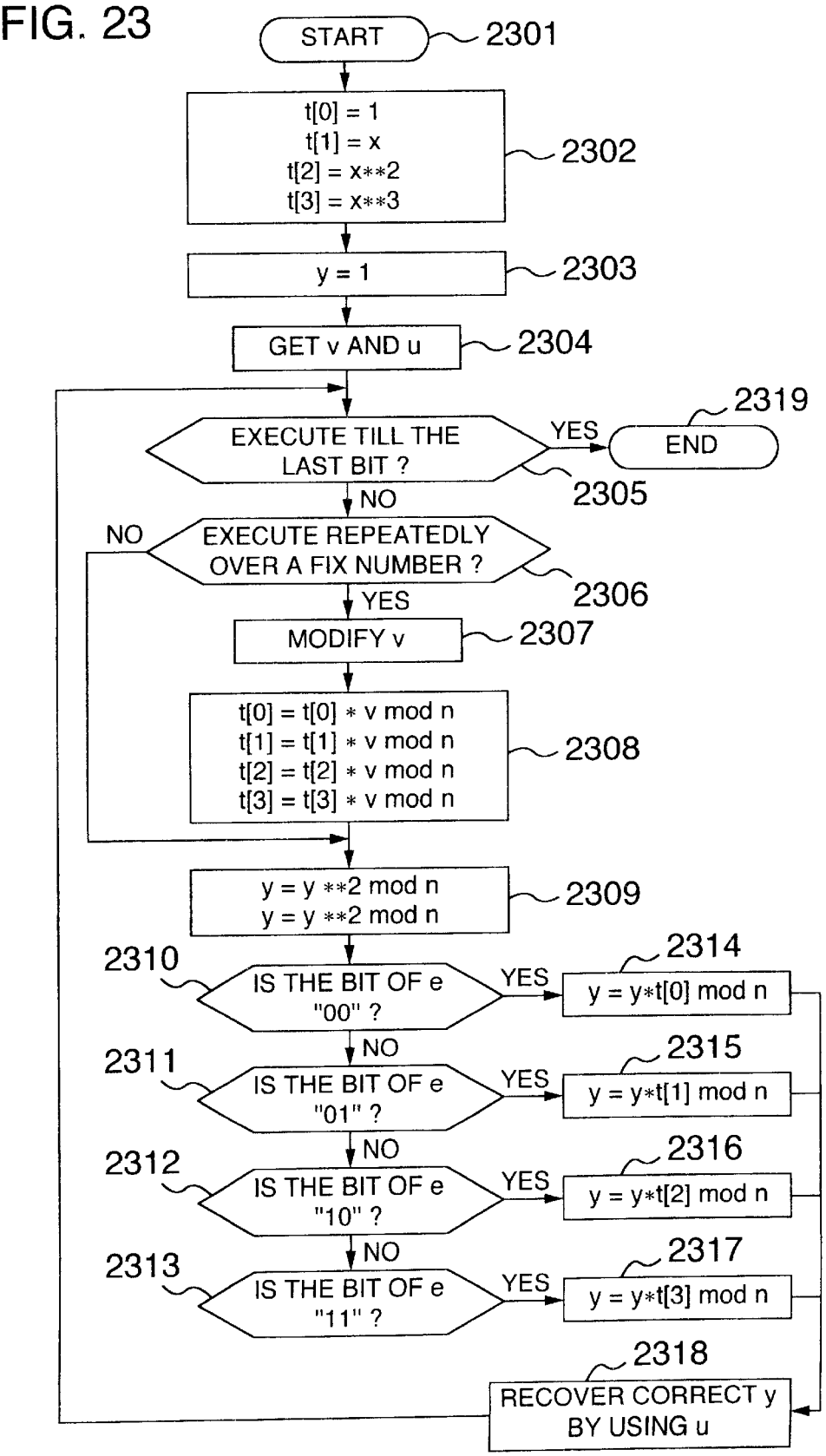
FIG. 23 illustrates a process routine of RSA wherein the inverse process for changing a modular exponentiation result of input data corresponding to bits is executed at an intermediate stage.

In the example of FIG. 23, (n+1)/2 is used as v and 2 is used as u. The values v and u are in an inverse number relation relative to the modular calculation using the modulus n. Namely, v*u mod n=1. In the modification process (2307) by v, used during the first repetitive processes of a predetermined number is $$v=1 \tag{23}$$

and used during the following repetitive processes is $$v=v*(n+1)/2 \tag{24}$$

If the modification by v=(n+1)/2 is removed every third repetitive processes during the process (2318), then $$u=((2**4*2)**4*2)**4*2 \tag{25}$$

which results in 285. As seen from the equation (25), in the processes shown in FIG. 23, y is multiplied by v in the unit of two bits because of the two-bit process, and the multiplication by v at the preceding processed (2314 to 2317) is removed. In the process (2318**), the following equation is calculated every third repetitive processes, $$y=y*2**85 \bmod n \tag{26}$$

to remove the multiplication of t[i] by (n+1)/2. If v is modified by ((n+1)/2)2 during the process (2307), the equation (25) is changed to $$u=(((22)**4*22)4*22)4*2**2 \tag{27}$$

and (22)85=2*170. In the process (2318), the following equation is calculated every third repetitive processes $$y=y*2**170 \bmod n \tag{28}$$

so that the modification of t[i] multiplied by ((N+1)/2)2 is removed. The equations (25) and (27) use (n+1)/2 as v and this value can be calculated before-hand. In the example of FIG. 23, the two-bit process for e is assumed, but a one-bit process, three-bit process or four-bit process may also be used in the examples shown in FIGS. 21 to 23**.

The process (2318) shown in FIG. 23 is an example of the "inverse process unit" which operates at the intermediate operation stage and does not operate after the processes for all bits of e are completed. In FIG. 23, the equations (21 to 28) are assumed to use v=(n+1)/2 and u=2. The processes (2202 and 2302) are an example of the "modular exponentiation process unit". The "modular exponentiation result change process unit" are realized by the processes 2207 and 2208 or the processes (2307 and 2308). The modular multiplication process unit" is realized by the processes (2210 to 2217) or the processes (2310 to 2317). The "inverse process unit" is realized by the process (2218) or (2318).

Figure 21:
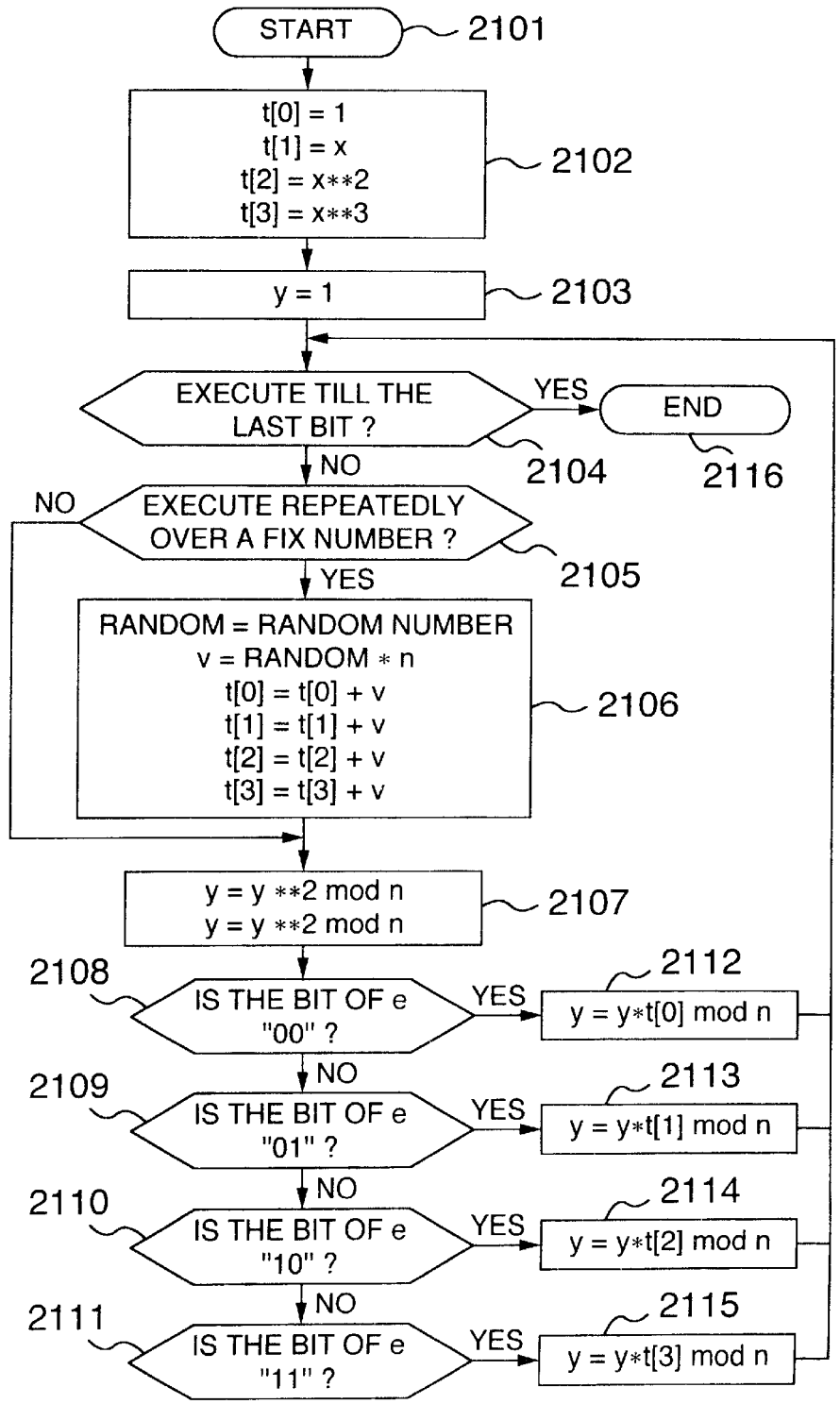
FIG. 21 illustrates a process routine of RSA wherein a modular exponentiation result of input data corresponding to bits is changed by adding an integer multiple of the modulus of a modular calculation.
Figure 22:
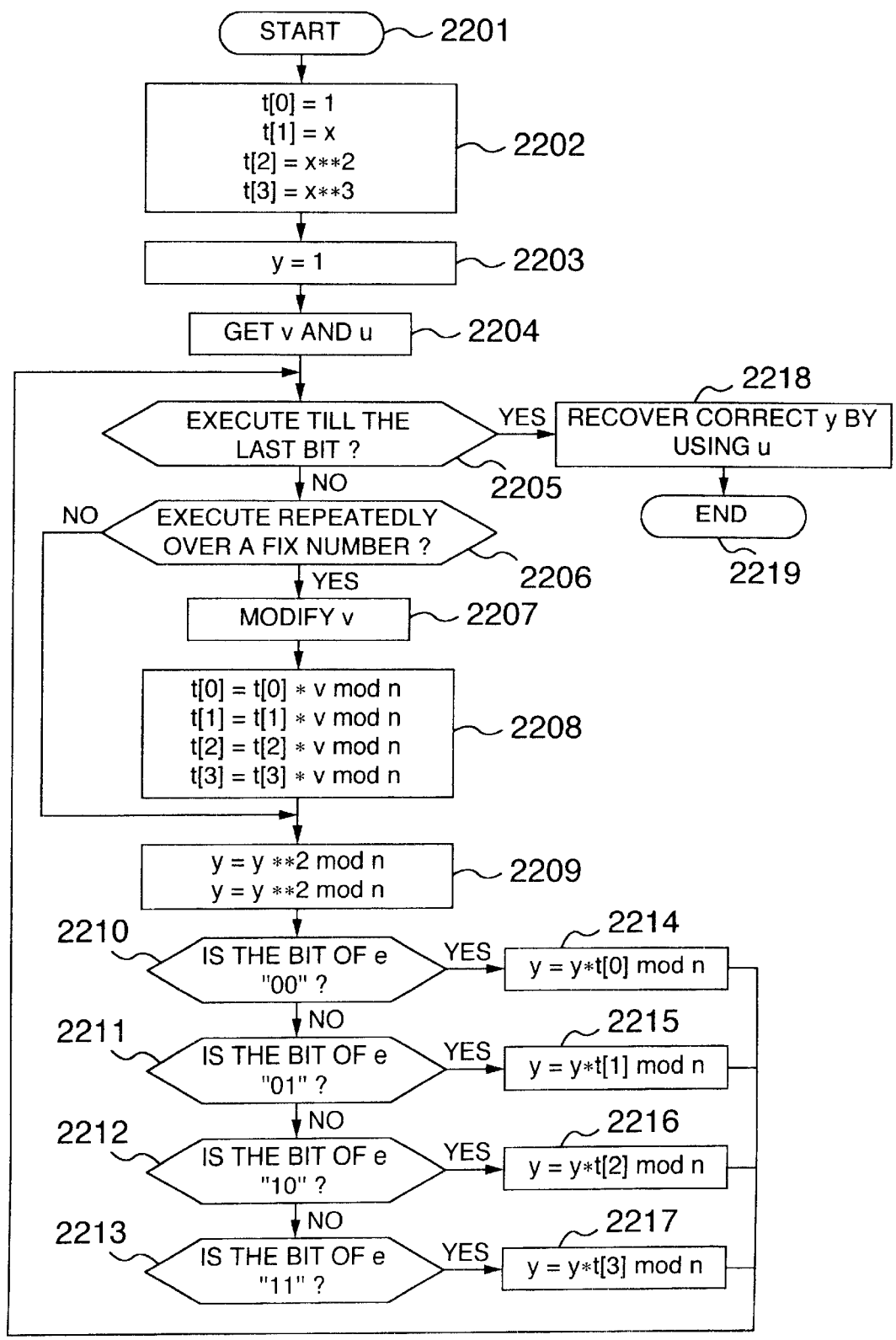
FIG. 22 illustrates a process routine of RSA wherein an inverse process for changing a modular exponentiation result of input data corresponding to bits is executed last.

The embodiment described with reference to FIGS. 21 to 23 is related to RSA. This embodiment may be applied to other cryptographic system using modular calculation, such as ElGamal cryptography. The modular exponentiation process unit" and "inverse process unit" shown in FIGS. 21 to 23 may be used for more general modular calculations. Although the embodiment is based upon the addition chain method described in "Introduction of Cryptography Theory", by Eiji Okamoto, KYOURITSU Publication Co., at page 95, the embodiment is also applicable to general modular exponentiation calculation of one-bit process.

The dependency of the wave shape of consumption current upon data during modular calculation is influenced not only by multipliers and multiplicands of modular multiplication but also by the value of a modulus N. Hiding the relation between the modulus value N and consumption current wave shape becomes necessary in order not to leak important information to the external. The following calculations are often used in the RSA cryptosystem or the like.

$$y=a*b \bmod n \tag{29}$$

The equation (29) is generalized to the following modular calculation.

$$y=a \bmod n \tag{30}$$

This indicates that a remainder of a divided by n is y and equivalent to the following equation.

$$a=n*x+y \tag{31}$$

By multiplying both the sides by an arbitrary value r, the following equation is obtained.

$$a*r=n*x*r+y*r \tag{32}$$

By representing this equation by a modular calculation equation, the following equation is obtained.

$$y*r=(a*r) \bmod (r*n) \tag{33}$$

This means that by multiplying the modulus N by r and the right side a by r, then the left side is also multiplied by r. One method of hiding the relation between the modulus data N and consumption current is to modify the modulus N. The equation (33) shows that if the modulus N is multiplied by r and the right side a is multiplied by r to perform a modular calculation, and if the result is divided by r, then the original y is obtained. In this manner, the relation between the modulus value N and consumption current can be hidden. This is particularly effective when "Chinese remainder theorem" at page 96 of "Introduction of Cryptography Theory" by Eiji Okamoto, KYOURITSU Publishing Co. is used for the modular calculation using prime factors p and q of a modulus N in the RSA calculation, to hide the information of p and q.

This process sequence will be described with reference to FIG. 31. First, a value r to be multiplied by N to modify it is acquired (3102). Next, in order to multiply the modulus N, it is multiplied by r (3103). The right side value is also multiplied by r (1304) to perform a modular calculation (3105). In order to recover the original value, the calculation result is divided by r (3106).

Figure 31:
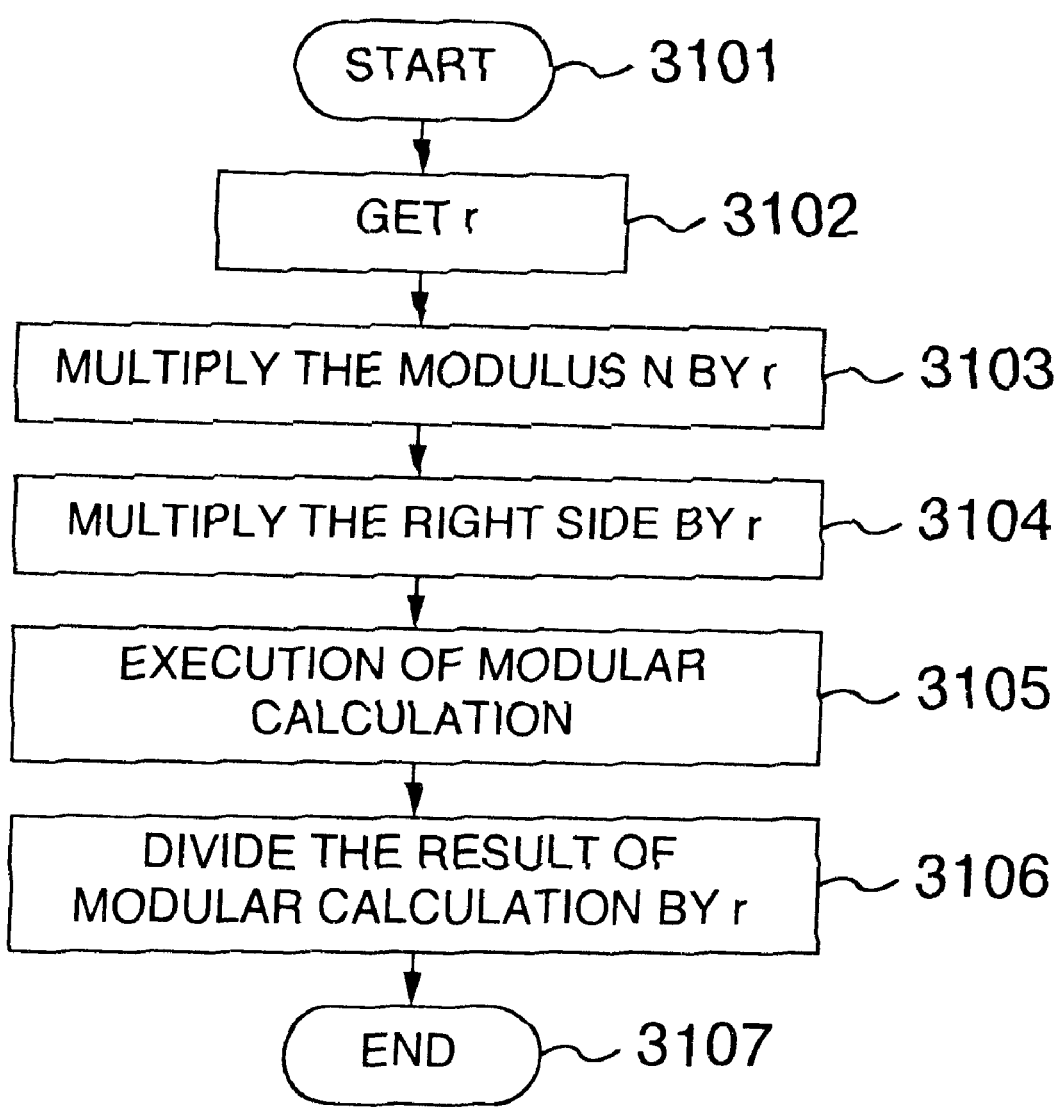
FIG. 31 illustrates a process sequence of modifying a modulus in a modular calculation.

The process (3103) shown in FIG. 31 is an example of a modulus change process unit for changing the modulus in a modular calculation, the process (3104) is an example of the value change process for changing the value of a right side of a modular calculation equation, and the process (3106) is an example of an inverse change unit for recovering the original modulus before it is changed by the modulus change process unit. In the example shown in FIG. 31, in order to change the modulus in a modular calculation and the right side of the modular calculation equation, an arbitrary value r is multiplied, and the inverse change unit divides the result by r.

If r to be used for changing the modulus N is set to 2 raised to a certain power, then the process of multiplying the modulus N and the right side value by r is realized by a left shift by the number of bits corresponding to the power. The process of dividing the result by r is realized by a right shift. Since multiplication and division are not used, the calculation can be performed at high speed. If 2 raised to the eighth power is used as r, multiplication and division are realized not by a shift instruction but by a data move instruction, so that the calculation can be performed at higher speed.

According to the invention, the process sequence of an IC card chip is randomized and a dummy process is added to modify the process data. Accordingly, it becomes difficult to presume the operation and cipher key by monitoring the wave shape of consumption current.

What is claimed is:

1. An information processing equipment comprising:
a storage memory including a program storage unit for storing a program and a data storage unit for storing data; and
a central processing unit for executing a predetermined process in accordance with the program to process the data, the program including one or more data process means each having a process instruction for giving an execution instruction to said central processing unit,
wherein the data is a combination of original data and bit inverted data obtained by inverting all bits of the original data in parallel such that the processing of the data by the central processing unit has a reduced correlation to current consumption.

2. An information processing equipment comprising:
a storage memory including a program storage unit for storing a program and a data storage unit for storing data; and
a central processing unit for executing a predetermined process in accordance with the program to process the data, the program including one or more data process means each having a process instruction for giving an execution instruction to said central processing unit,
wherein the data process means includes original data and bit inverted data obtained by inverting all bits of the original data in parallel, by using a same instruction.

3. An information processing equipment comprising:
a storage memory including a program storage unit for storing a program and a data storage unit for storing data; and
a central processing unit for executing a predetermined process in accordance with the program to process the data, the program including one or more data process means each having a process instruction for giving an execution instruction to said central processing unit,
wherein the data process means includes original data instruction and bit inverted data instruction processing means having an instruction same as a normal process instruction and an instruction for processing data obtained by inverting all bits of original data in parallel.

4. An information processing equipment comprising:
a storage memory including a program storage unit for storing a program and a data storage unit for storing data; and
a central processing unit for executing a predetermined process in accordance with the program to process the data, the program including one or more data process means each having a process instruction for giving an execution instruction to said central processing unit,
wherein the data processing means includes bit inverted data generation means for generating, in parallel, data which is bit inverted data of all bits of original data.

5. An information processing equipment according to claim 1, wherein the data process means includes permutation means for permuting data in the unit of a bit.

6. An information processing equipment according to claim 1, wherein the data process means includes substitution means for substituting data in the unit of a byte.

7. An information processing equipment according to claim 1, wherein the data process means includes exclusive logical OR process means for performing an exclusive logical OR of input data and cipher key data and exclusive logical OR process means for performing an exclusive logical OR of bit inverted input data and the cipher key data.

8. An information processing equipment according to claim 1, wherein the data process means includes nonlinear substitution process means for nonlinearly substituting input data and generating a substitution result and bit inverted substitution result and nonlinear substitution process means for nonlinearly substituting input bit inverted data and generating a substitution result and bit inverted substitution result.

9. An information processing equipment according to claim 1, wherein the data process means includes nonlinear permutation process means for nonlinearly permuting input data and generating a permutation result and bit inverted permutation result and nonlinear permutation process means for nonlinearly permuting input bit inverted data and generating a permutation result and bit inverted permutation result.

10. An information processing equipment according to claim 1, wherein the data process means includes: exclusive logical OR process means for performing an exclusive logical OR of input data and cipher key data; exclusive logical OR process means for performing an exclusive logical OR of bit inverted input data and the cipher key data; nonlinear substitution process means for nonlinearly substituting input data and generating a substitution result and bit inverted substitution result; nonlinear substitution process means for nonlinearly substituting input bit inverted data and generating a substitution result and bit inverted substitution result; nonlinear permutation process means for nonlinearly permuting input data and generating a permutation result and bit inverted permutation result; and nonlinear permutation process means for nonlinearly permuting input bit inverted data and generating a permutation result and bit inverted permutation result.

11. An information processing equipment according to claim 1, wherein the equipment is an IC card.

12. An information processing equipment according to claim 1, wherein information of said original data and said bit inverted data is expressed with two different voltages, one of which is a relatively low voltage and another of which is a relatively high voltage.

* * * * *